US012450468B2

(12) United States Patent
Ditto et al.

(10) Patent No.: US 12,450,468 B2
(45) Date of Patent: Oct. 21, 2025

(54) PHYSICS AUGMENTED NEURAL NETWORKS CONFIGURED FOR OPERATING IN ENVIRONMENTS THAT MIX ORDER AND CHAOS

(71) Applicant: North Carolina State University, Raleigh, NC (US)

(72) Inventors: William Lawrence Ditto, Wake Forest, NC (US); John Florian Lindner, Wooster, OH (US); Sudeshna Sinha, Punjab (IN); Scott Thomas Miller, Brooklyn, NY (US); Anshul Choudhary, Raleigh, NC (US); Elliott Gregory Holliday, Durham, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 1056 days.

(21) Appl. No.: 17/492,172

(22) Filed: Oct. 1, 2021

(65) Prior Publication Data
US 2022/0108151 A1    Apr. 7, 2022

Related U.S. Application Data

(60) Provisional application No. 63/086,549, filed on Oct. 1, 2020.

(51) Int. Cl.
*G06N 3/088* (2023.01)
*G06N 3/04* (2023.01)
*G06N 3/045* (2023.01)

(52) U.S. Cl.
CPC ........... *G06N 3/0418* (2013.01); *G06N 3/045* (2023.01); *G06N 3/088* (2013.01)

(58) Field of Classification Search
CPC ...... G06N 3/0418; G06N 3/045; G06N 3/088; G06N 3/04; G06N 3/063; G06N 3/08
See application file for complete search history.

(56) References Cited

U.S. PATENT DOCUMENTS

2019/0114557 A1*    4/2019    Ashrafi .................. G06N 3/063

OTHER PUBLICATIONS

Mattheakis, M., et al. "Hamiltonian Neural Networks for solving differential equations (2020)." arXiv preprint ArXiv:2001.11107. (Year: 2020).*

(Continued)

*Primary Examiner* — Kamran Afshar
*Assistant Examiner* — Brian J Hales
(74) *Attorney, Agent, or Firm* — Jenkins, Taylor & Hunt, P.A.

(57) ABSTRACT

Methods, systems, and computer readable media for utilizing an augmented neural network are disclosed. In one embodiment, the method includes utilizing a neural network (NN) pre-processor to convert generic coordinates associated with a dynamical system to canonical coordinates, concatenating a Hamiltonian neural network (HNN) to the NN pre-processor to create a generalized HNN, and training the generalized HNN to learn nonlinear dynamics present in the dynamical system from generic training data. The method also includes utilizing the trained generalized HNN to forecast the nonlinear dynamics, and quantifying chaotic behavior from the forecasted nonlinear dynamics to discover and map one or more transitions between orderly states and chaotic states exhibited by the dynamical system.

30 Claims, 38 Drawing Sheets
(29 of 38 Drawing Sheet(s) Filed in Color)

(56) References Cited

OTHER PUBLICATIONS

Lellep, Martin, et al. "Using Machine Learning to predict extreme events in the Hénon map." arXiv preprint arXiv:2002.10268 (2020). (Year: 2020).*
Choudhary, et al., "Forecasting Hamiltonian Dynamics Without Canonical Coordinated", arXiv:2010.15201 (2020).
Mohammadzadeh, "A Non-Singleton Type-2 Fuzzy Neural Network with Adaptive Secondary Membership for High Dimensional Applications", Neurocomputing, pp. 63-71 (2019).
Mohammadzadeh, "A Novel General Type-2 Fuzzy Controller for Fractional-Order Multi-Agent Systems Under Unknown Time-Varying Topology", Journal of the Franklin Institute, pp. 5151-5171 (2019).
Liang, "Interval Type-2 Fuzzy Logic Systems: Theory and Design", IEEE Trans. Fuzzy Syst, (2000).
Chartrand, "Numerical Differentiation of Noisy, Nonsmooth Data", ISRN Applied Mathematics, (2011).
Savitzky, et al., "Smoothing and Differentiation of Data by Simplified Least Squares Procedures", Analytical Chemistry, vol. 36 (No. 8), pp. 1627-1639 (Jul. 1964).
O'Dwyer, "Whence Lotka-Volterra? Conservation Laws and Integrable Systems in Ecology", Theoretical Ecolology, (2018).
Plank, "Hamiltonian Structures for the N-Dimensional Lotka-Volterra Equations", Journal of Mathematical Physics, vol. 36 (Issue 7), (1995).
Baydin, et al., "Automatic Differentiation in Machine Learning: A Survey", Journal Machine Learning Research, pp. 1-43 (2018).
Lotka, "Contribution to the Theory of Periodic Reactions", The Journal of Physical Chemistry, vol. 14 (No. 3), pp. 271-274 (2002).
Miller, et al., "Negotiating the Separatrix with Machine Learning", Nonlinear Theory and Its Applications (IEICE), vol. 12 (No. 2), pp. 134-142 (Apr. 1, 2021).
Miller, et al., "Mastering High-Dimensional Dynamics with Hamiltonian Neural Networks", arXiv: 2008.04214.v1 (2020).
Kingma, et al.,"Adam: A Method for Stochastic Optimization", arXiv: 1412.6980.v9 (2017).
Champion, et al., "Data-Driven Discovery of Coordinates and Governing Equations", Proceedings of the National Academy of Sciences, vol. 116 (No. 45), pp. 22445-22451 (Nov. 5, 2019).
Brunton, et al., "Discovering Governing Equations from Data by Sparse Identification of Nonlinear Dynamical Systems", Proceedings of the National Academy of Sciences, vol. 113 (No. 15), pp. 3932-3937 (Apr. 12, 2016).
Bongard, et al., "Automated Reverse Engineering of Nonlinear Dynamical Systems", Proceedings of the National Academy of Sciences, vol. 104 (No. 24), pp. 9943-9948 (Jun. 12, 2007).
Choudhary, et al., "Physics-Enhanced Neural Networks Learn Order and Chaos", Physical Review E, pp. 62207-1-62207-8 (Jun. 18, 2020).
Pathak, et al., "Model-Free Prediction of Large Spatiotemporally Chaotic Systems from Data: A Reservoir Computing Approach", Physical Review Letters 120, pp. 1-5 (Jan. 12, 2018).
Greydanus, et al., "Hamiltonian Neural Networks", pp. 1-16 (Sep. 5, 2019).
Schmidt et al., "Distilling Free-Form Natural Laws from Experimental Data", Science 324, pp. 1-6 (Apr. 3, 2009).
Laje et al., "Robust timing and motor patterns by taming chaos in recurrent neural networks", Nature Neuroscience, vol. 16, No. 7, pp. 1-12 (Jul. 2013).
Tenenbaum et al., "A Global Geometric Framework for Nonlinear Dimensionality Reduction", Science, vol. 290, pp. 1-5 (2000).
Biswas et al., "Theory of Fluctuations in Pseudointegrable Systems", The American Physical Society, vol. 70, No. 7, pp. 1-4 (Feb. 15, 1993).
Biswas et al. "Classical Resonances and an Arbitrary Trajectory Quantizationh Scheme for a Chaotic System", The American Physical Society, vol. 71, No. 23, pp. 1-4 (Dec. 6, 1993).

Gutzwiller, "Periodic Orbits and Classical Quantization Conditions", Journal of Mathematics Physics, vol. 12, pp. 1-17 (Mar. 1971).
Berry, "Semiclassical theory of spectral rigidity", Proc. R. Soc. Lond., vol. 400, pp. 1-23 (1985).
Chen et al., "Electron optics with p—n juncations in ballistic graphene", Science, vol. 353, issue 6307, pp. 1-5 (Sep. 30, 2016).
Ponomarenko et al. "Chaotic Dirac Billiard in Graphene Quantum Dots", Science, vol. 320, pp. 1-4 (Apr. 18, 2008).
Stockmann et al., "Quantum Chaos in Billiards Studied by Microwave Absorption", Physical Review Letters, vol. 64, No. 19, pp. 1-4 (May 7, 1990).
Nockel et al., "Ray and wave chaos in asymmetric resonant optical cavities", Nature, vol. 385, pp. 1-3 (Jan. 2, 1997).
Kamor et al., "Annular billiard dynamics in a circulary polarized strong laser field", Physical Review E 85, pp. 1-10 (2012).
Wang et al., "Emergent Schrodinger equation in an introspective machine learning architecture", Science Bulletin 64, pp. 1-6 (2019).
Skokos et al., "Alignment Indices: A New, Simple Method for Determining the Ordered or Chaotic Nature of Orbits" Journal of Physics a Mathematical and General, pp. 1-16 (Nov. 2001).
Koyanagi et al., "Application of Hamiltonian of ray motion to room acoustics" The Journal of the Acoustical Society of America 124, pp. 1-5 (May 2008).
Melnikov et al., The Maximum Lyapunov Exponent of the Chaotic Motion in the Henon-Heiles Problem, Astronomical Society of the Pacific, vol. 316, pp. 1-3 (2004).
Carroll et al., "Network structure effects in reservoir computers" Chaos 29, pp. 1-13 (Mar. 27, 2019).
Pathak et al., "Model-Free Prediction of Large Spatiotemporally Chaotic Systems from Data: A Reservoir Computing Approach", Physical Review Letters 120, pp. 1-5 (Jan. 12, 2012).
Jaeger et al., "Harnessing Nonlinearity: Predicting Chaotic Systems and Saving Energy in Wireless Communication" Science, vol. 304, pp. 1-4 (Apr. 2, 2004).
Hornik, "Approximation Capabilites of Multilayer Feedforward Networks", Neural Networks, vol. 4, pp. 1-7 (1991).
Cybenko, "Approximation by Superpositions of a Sigmoidal Function" Math Controls Signals Systems, pp. 1-12 (1989).
MacKay et al., "Stochasticity and Transport in Hamiltonian System", The American Physical Society, vol. 52, No. 9, pp. 1-4 (Feb. 27, 1984).
Vendrell et al., "Multilayer multiconfiguration time-dependent Hartree method: Implementation and applications to a Henon-Heiles Hamiltonian and to pyrazine", The Journal of Chemical Physics 134, pp. 1-17 (Jan. 28, 2011).
Feit et al., "Wave packet dynamics and chaos in the Henon-Heiles system", The Journal of Chemicl Physics 80, pp. 1-8 (1984).
Waite et al., "Mode specificity in unimolecular reaction dynamics: The Henon-Heiles potential energy surfaces", The Journal of Chemical Physics 74, pp. 1-7 (1981).
Henon et al., "The Applicability of the Third Integral of Motion: Some Numerical Experiments", The Astronomical Journal, vol. 69, No. 1, pp. 1-7 (Feb. 1964).
Bondesan et al., "Learning Symmetries of Classial Integrable Systems", pp. 1-8 (Jun. 11, 2019).
Bertalan et al., "On learning Hamiltonian systems from data" Chaos 29, pp. 1-10 (Dec. 31, 2019).
Mattheakis et al., "Physical Symmetries Embedded in Neural Networks", pp. 1-16 (Jan. 29, 2020).
Toth et al., "Hamiltonian Generative Networks", pp. 1-19 (Feb. 14, 2020).
Toth et al., "Hamiltonian Neural Networks", pp. 1-16 (Sep. 5, 2019).
Silver et al., "A general reinforcement learning algorithm that masters chess, shogi, and Go through self-play", Science 362, pp. 1-6 (Dec. 7, 2018).
Breen et al., "Newton versus the machine:solving the chaotic three-body problem using deep neural networks", Royal Astronomical Society 949, pp. 1-6 (2020).
Lample et al., "Deep Learning for Symbolic Mathematics", pp. 1-24 (Dec. 2, 2019).

(56) References Cited

OTHER PUBLICATIONS

Wu et al., "Toward an artifical intelligence physicist for unsupervised learning", Physical Review E 100, pp. 1-19 (Sep. 19, 2019).
Udrescu et al., "AI Feynamn: A physics-inspried method from symbolic regression", Science Advances, vol. 6, pp. 1-17 (Apr. 15, 2020).
Iten et al., "Discovering Physical Concepts with Neural Networks", Physical Review Letters 124, pp. 1-6 (Jan. 8, 2020).
Lusch et al., "Deep learning for universial linear embeddings of nonlinear dynamics", Nature Communications, pp. 1-10 (2018).
Lorenz et al., "Deterministic Nonperiodic Flow", Journal of the Atmospheric Sciences, vol. 20, pp. 1-12 (Jan. 7, 1963).
Poincare, "Libri Nuovi", pp. 1-3 (1899).
Hamilton, "General Method in Dynmanics", pp. 1-62 (1834).

* cited by examiner

| Description | Values |
|---|---|
| Number of layers | 2, 4, 6, 8 |
| Neurons per layer | 100, 200, 400 |
| Optimizer | Adam, SGD |
| Training loss threshold | $10^{-4}, 10^{-5}$ |
| Batch size | 128, 256, 512 |
| Epochs | 10, 50, 100 |
| Activations | Tanh, ReLU |
| Orbit time | 1000, 5000 |
| Energy samples | 20 |
| Orbits per energy | 20, 50 |
| Integration scheme | RK4, RK45, Symplectic |
| Data sampling rate | 0.01, 0.1, 1, 10 |

FIG. 3

ALGORITHM 1 Generating orbit from learned model.

```
1: procedure EVOLVE(state, model)
2:     q₁, q₂, p₁, p₂ ← state
3:     while t <= T do                                          ▷ Integration Loop
4:         f_ows ← q̇₁, q̇₂, ṗ₁, ṗ₂ ← MUPDATE(state, model)       ▷ Model update
5:         q₁^{t+1}, q₂^{t+1}, p₁^{t+1}, p₂^{t+1} ← RK45(f_ows, state)  ▷ Integrate one step
6:         state ← q₁^{t+1}, q₂^{t+1}, p₁^{t+1}, p₂^{t+1}
7:     end while
8:     return q₁, q₂, p₁, p₂                                    ▷ Return the full orbit
9: end procedure
```

FIG. 13

ALGORITHM 2. Model update subroutine.

1: procedure MUPDATE(state, model)
2:  if model == NN then
3:   flow ← $q_1, q_2, p_1, p_2$ ← NN.Forward(state)          ▷ Forward pass
4:  else
5:   $\mathcal{H}$ ← HNN.Forward(state)                       ▷ Forward pass
6:   flow ← $q_1, q_2, p_1, p_2$ ← backprop($\mathcal{H}$, state)  ▷ Gradients using back-propagation
7:  end if
8:  return flow                                               ▷ Return the vector field
9: end procedure

Table A1
Mathematica neural network training parameters.

| Symbol | Name | Value |
|---|---|---|
| $N_l$ | hidden layers (depth) | 2 |
| $N_i$ | neurons / layer (width) | $2^8$ |
| $N_N = N_l N_i$ | neurons | $2^9$ |
| $T$ | training time / orbit | $2\pi$ |
| $\Delta t$ | sampling time | $2\pi/2^7$ |
| $T/\Delta t$ | samples / orbit | $2^7$ |
| $N_b$ | orbits | $2^{14}$ |
| $N_s = N_b T/\Delta t$ | training pairs | $2^{14}$ |
| $N_B$ | batches | 1 |
| $N_s = N_B N_s$ | batch size = pairs / batch | $2^{14}$ |
| $N_e$ | epochs = data visits | $2^4$ |
| $N_t = N_e N_s$ | total inputs | $2^{18}$ |
| $\Delta E$ | training energy range | $[10^{-3}, 1]$ |
| $\eta$ | learning rate | $10^{-3}$ |
| $\sigma$ | activation function | tanh |

← 1702

Table A2
Python neural network training parameters.

| Symbol | Name | Value |
|---|---|---|
| $N_l$ | hidden layers (depth) | 2 |
| $N_i$ | neurons / layer (width) | $2^8$ |
| $N_N = N_l N_i$ | neurons | $2^9$ |
| $T$ | training time / orbit | $10^2$ |
| $\Delta t$ | sampling time | 0.1 |
| $T/\Delta t$ | samples / orbit | $10^3$ |
| $N_b$ | batches | $2^{15}$ |
| $N_s$ | batch size = pairs / batch | 1 |
| $N_s = N_B N_s$ | training pairs | $\leq 2^{15}$ |
| $N_e$ | epochs = data visits | $2^4$ |
| $N_t = N_e N_s$ | total inputs | $\leq 2^{19}$ |
| $\Delta E$ | training energy range | $[0, 100]$ |
| $\eta$ | learning rate | $10^{-3}$ |
| $\sigma$ | activation function | tanh |

| Symbol | Description |
|---|---|
| l | Layer number |
| a | Neuron activity |
| w | Neural network weights |
| b | Neural network biases |
| x | Input |
| y | Output |
| L | Neural network loss function |
| q | Position |
| v | Velocity |
| ζ | Position-velocity state space |
| Q | Canonical coordinate |
| P | Canonical momentum |
| R | Coordinate-momentum phase space |
| Θ | Observed generalised coordinates |
| H | Hamiltonian |
| J | Jacobian matrix |
| S | Symplectic matrix |
| T | Kinetic energy |
| V | Potential energy |
| L | Lagrangian |
| n | Normalised population |
| α, β, γ, δ | Population growth parameters |
| θ | Pendulum angle |
| ℓ | Pendulum length |
| m | Mass |
| g | Gravitational field magnitude |
| t | Time |

FIG. 25

| parameter | value |
|---|---|
| hidden layers (depth) | 2 |
| neurons/layer (width) | $2^5$ |
| energy range | $2.00 < E < 2.11$ |
| time range | $0 < t < 10$ |
| sampling rate | $10^{-2}$ |
| orbits | $10^3$ |
| points/orbit | $10^5$ |
| points/batch | 1 |
| epochs | $2^4$ |
| learning rate | $10^{-3}$ |
| training pairs | $2^7 \leq N \leq 2^{15}$ |
| activation | tanh |
| optimizer | Adam |
| integrator | RK45 |

PHYSICS AUGMENTED NEURAL NETWORKS CONFIGURED FOR OPERATING IN ENVIRONMENTS THAT MIX ORDER AND CHAOS

RELATED APPLICATIONS

This application claims the priority benefit of U.S. Provisional Patent Application Ser. No. 63/086,549, filed Oct. 1, 2020, the disclosure of which is incorporated herein by reference in its entirety.

GOVERNMENT INTEREST

This invention was made with government support under grant number N00014-16-1-3056 awarded by the U.S. Office of Naval Research. The government has certain rights in the invention.

TECHNICAL FIELD

The presently disclosed subject matter relates generally to neural networks and physics based training. More particularly, the present subject matter described herein relates to methods, systems, and computer readable media for utilizing physics augmented neural networks configured for operating in environments that mix order and chaos.

BACKGROUND

Presently, artificial neural networks are popular tools in industry and academia, especially for classification and regression, and are beginning to elucidate nonlinear dynamics and fundamental physics. Recent neural networks outperform traditional techniques in symbolic integration and numerical integration and outperform humans in strategy games, such as chess and Go. But neural networks have a blind spot as they are unaware of the chaos and strange attractors of nonlinear dynamics, where exponentially separating trajectories bounded by finite energy repeatedly stretch and fold into complicated self-similar fractals. Attempts by neural networks to learn and predict nonlinear dynamics can be frustrated by ordered and chaotic orbits (e.g., irregular dynamic behavior) coexisting at the same energy for different initial positions and momenta.

Recent research features artificial neural networks that incorporate Hamiltonian structure to learn fundamental dynamical systems. But from stormy weather to swirling galaxies, natural dynamics is far richer and more challenging.

Accordingly, a need exists for improved methods, systems, and computer readable media for utilizing physics augmented neural networks configured for operating in environments that mix order and chaos.

SUMMARY

Methods, systems, and computer readable media for utilizing physics augmented neural networks configured for operating in environments that mix order and chaos are disclosed. In one embodiment, the method includes utilizing a neural network (NN) pre-processor to convert generic coordinates associated with a dynamical system to canonical coordinates, concatenating a Hamiltonian neural network (HNN) to the NN pre-processor to create a generalized HNN, and training the generalized HNN to learn nonlinear dynamics present in the dynamical system from generic training data. The method also includes utilizing the trained generalized HNN to forecast the nonlinear dynamics, and quantifying chaotic behavior from the forecasted nonlinear dynamics to discover and map one or more transitions between orderly states and chaotic states exhibited by the dynamical system.

According to another aspect of the subject matter described herein, a method wherein the generalized HNN is utilized to execute applications including a self-driving automobile application, a drone piloting application, a tracking application, an aerospace application, a social network dynamic application, and a control system application.

According to another aspect of the subject matter described herein, a method wherein the dynamical system is a nonlinear system.

According to another aspect of the subject matter described herein, a method wherein the generalized HNN is further configured to detect when a macroscopic system is unable to be modeled using Hamiltonian dynamics.

According to another aspect of the subject matter described herein, a method wherein the generalized HNN is trained using physics-informed machine learning.

According to another aspect of the subject matter described herein, a method wherein the generalized HNN is a feed-forward neural network that is configured to learn from the generic training data.

According to another aspect of the subject matter described herein, a method wherein a customized loss function is utilized to compel a Hamiltonian phase space flow.

According to another aspect of the subject matter described herein, a method wherein the generalized HNN utilizes a neural network autoencoder to capture dimensionality.

According to another aspect of the subject matter described herein, a method wherein the dynamic system is a Hénon-Heiles system.

According to another aspect of the subject matter described herein, a method wherein the chaotic behavior is quantified using a smaller alignment indices metric.

In another embodiment, a system for utilizing physics augmented neural networks configured for operating in environments that mix order and chaos includes at least one processor, a memory element, and a neural network pre-processor configured to convert generic coordinates associated with a dynamical system to canonical coordinates. The system further includes an augmented HNN engine stored in the memory element and when executed by the at least one processor is configured for concatenating a Hamiltonian neural network (HNN) to the NN pre-processor to create a generalized HNN, training the generalized HNN to learn nonlinear dynamics present in the dynamical system from generic training data, utilizing the trained generalized HNN to forecast the nonlinear dynamics, and quantifying chaotic behavior from the forecasted nonlinear dynamics to discover and map one or more transitions between orderly states and chaotic states exhibited by the dynamical system.

The subject matter described herein may be implemented in hardware, software, firmware, or any combination thereof. As such, the terms "function" "node", "engine" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter described herein will now be explained with reference to the accompanying drawings of which:

FIG. 3 illustrates an exemplary table containing neural network parameters according to an embodiment of the subject matter described herein;

FIG. 13 illustrates an exemplary algorithm for generating orbit from a learned model according to an embodiment of the subject matter described herein;

FIG. 14 illustrates an exemplary algorithm for a model update subroutine according to an embodiment of the subject matter described herein;

FIG. 17 illustrates tables of exemplary neural network training parameters according to an embodiment of the subject matter described herein;

FIG. 25 illustrates a table of exemplary mathematical symbols and parameters according to an embodiment of the subject matter described herein;

DETAILED DESCRIPTION

The subject matter described herein relates to methods, systems, and computer readable media for utilizing physics augmented neural networks configured for operating in environments that mix order and chaos. Notably, the disclosed subject matter leverages the Hamiltonian structure of conservative systems to provide neural networks with the physics intelligence needed to learn the mix of order and chaos that often characterizes natural phenomena. In some embodiments, the disclosed subject matter comprises an Artificial Intelligence Hamilton (AIH) software engine that instantiates an Advanced Hamiltonian Neural Network (AHNN) method. After reviewing Hamiltonian chaos and neural networks, the disclosed subject matter can apply Hamiltonian neural networks to the Hénon-Heiles potential, a numerical and dynamical benchmark, which can model both stellar and molecular dynamics Even as these systems transition from order to chaos, Hamiltonian neural networks correctly learn their dynamics, overcoming deep learning's chaos blindness. If chaos is a nonlinear "super power," enabling deterministic dynamics to be practically unpredictable, then the Hamiltonian is a neural network that enables learning and forecasting order and chaos.

Hamiltonian Chaos

The Hamiltonian formalism describes phenomena from astronomical scales to quantum scales. Even dissipative systems involving friction or viscosity are microscopically Hamiltonian. It reveals underlying structures in position-momentum phase space and reflects essential symmetries in physical systems. Its elegance stems from its geometric structure, where positions q and conjugate momenta p form a set of 2N canonical coordinates describing a physical system with N degrees of freedom. A single Hamiltonian function $\mathcal{H}$ uniquely generates the time evolution of the system via the 2N coupled differential equations $$\{\dot{q},\dot{p}\}=\{dq/dt, dp/dt\}=\{+\partial\mathcal{H}/\partial p, -\partial\mathcal{H}/\partial q\},$$

where the overdots are Newton's notation for time derivatives.

Figure 1:
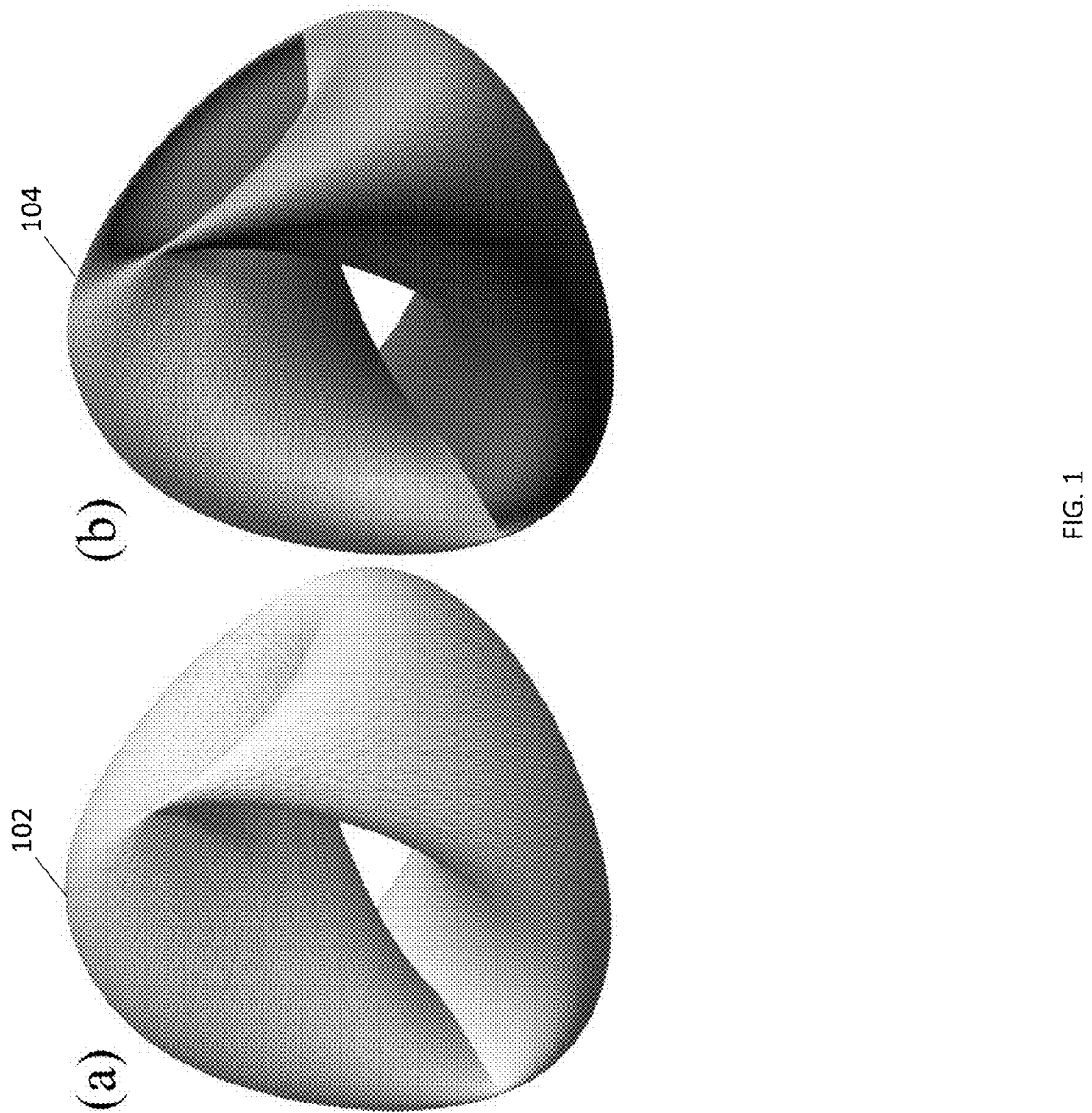
FIG. 1 illustrates an exemplary instances of Hamiltonian flow according to an embodiment of the subject matter described herein.

This classical formalism exhibits two contrasting dynamics: simple integrable motion suggests a "clockwork universe," while complicated nonintegrable motion suggests a chaotic one. Additional conserved quantities constrain integrable orbits to smooth N-dimensional "kamtori" in 2N-dimensional phase space, as in FIG. 1, but increasing nonlinearity can "fractalize" adjacent kamtori into infinitely intersecting "cantori", allowing nonintegrable orbits to wander over the entire phase space, extremely sensitive to initial conditions, and constrained only by energy. For example, FIG. 1 illustrates an exemplary Hamiltonian flow depicting a Hénon-Heiles orbit 102 wrapped many times around the hypertorus appears to intersect at the creases in this three-dimensional (3D) projection. Different colors in orbit 104 indicating the fourth dimension show that the apparent intersections are actually separated in four-dimensional (4D) phase space.

The Hénon-Heiles potential, which models phenomena ranging from the orbits of stars to the vibrations of molecules, provides an example of such an order-to-chaos transition. In a four-dimensional phase space $\{q, p\}=\{q_x, q_y, p_x, p_y\}$, its nondimensionalized Hamiltonian is represented as:

$$\mathcal{H}=(p_x^2+p_y^2)/2+(q_x^2+q_y^2)/2+(q_x^2 q_y-q_y^3/3)$$

which is the sum of the kinetic and potential energies, including quadratic harmonic terms perturbed by cubic nonlinearities that convert a circularly symmetric potential into a triangularly symmetric potential. Bounded motion is possible in a triangular region of the $\{x, y\}$ plane for energies $0<E<\frac{1}{6}$. As orbital energy increases, circular symmetry degenerates to triangular symmetry, integrable motion degrades to nonintegrable motion, kamtori become cantori, and ordered islands give way to a chaotic sea.

Neural Networks

While traditional analyses focus on forecasting orbits or understanding fractal structure, understanding the entire landscape of dynamical order and chaos requires new tools. Artificial neural networks are today widely used and studied partly because they can approximate any continuous function. Recent efforts to apply artificial neural networks to chaotic dynamics involve the recurrent neural networks of reservoir computing. Instead, the dominant feed-forward neural networks of deep learning can be exploited.

Inspired by natural neural networks, the activity $a_\ell=\sigma[W_\ell a_{\ell-1}+b_\ell]$ of each layer of a conventional feed-forward neural network is the nonlinear step or ramp of the linearly transformed activities of the previous layer, where $\sigma$ is a vectorized nonlinear function that mimics the on-off activity of a natural neuron, $a_\ell$ are activation vectors, and $W_\ell$ and $b_\ell$ are adjustable weight matrices and bias vectors that mimic the dendrite and axon connectivity of natural neurons. Concatenating multiple layers eliminates the hidden neuron activities, so the output $y=f_P[x]$ is a parametrized nonlinear function of just the input x and the weights and biases $P=\{W_\ell, b_\ell\}$. A training session inputs multiple x and adjusts the weights and biases to minimize the difference or "loss" $\mathcal{L}=(y_t-y)^2$ between the target $y_t$ and the output y so the neural network learns the correspondence.

Figure 2:
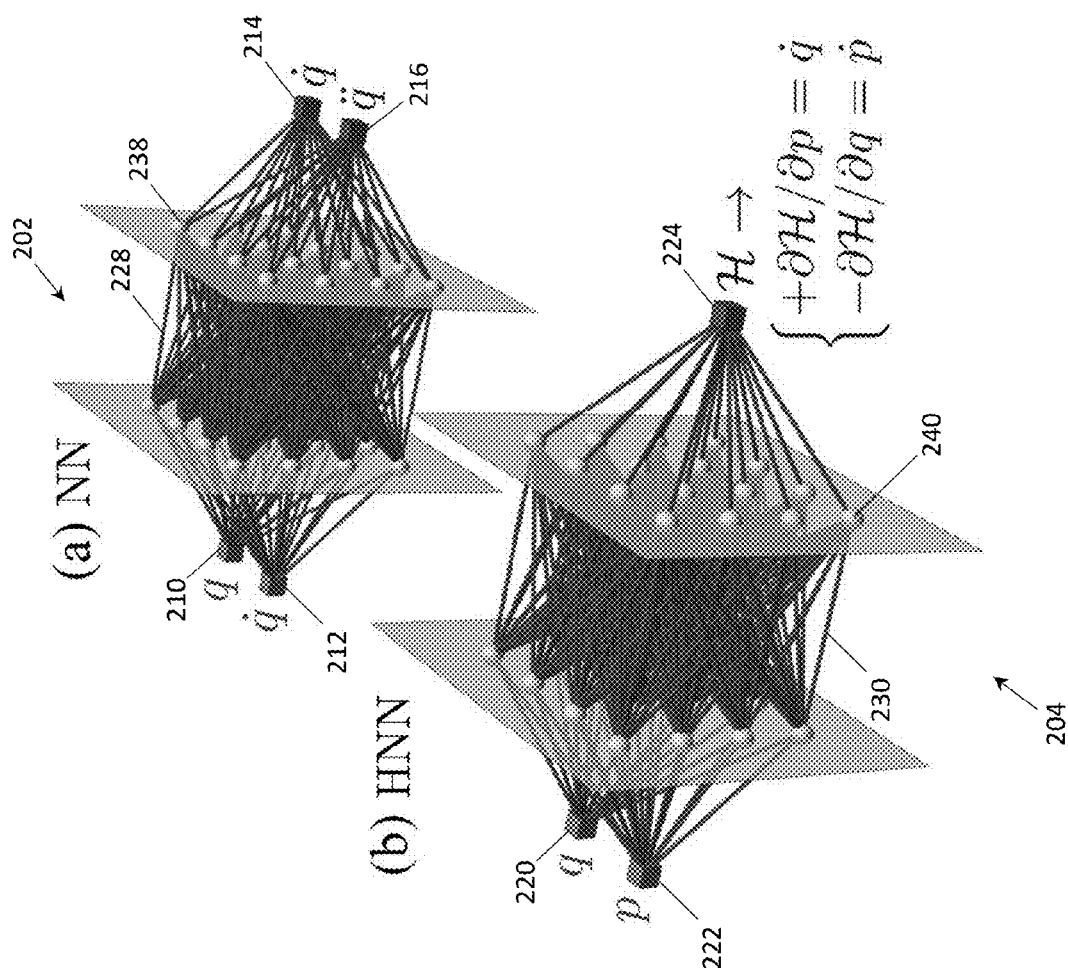
FIG. 2 illustrates exemplary schematics of a neural network (NN) and a Hamiltonian neural network (HNN) according to an embodiment of the subject matter described herein.

In FIG. 2, a pair of neural network schematics is illustrated. Notably, weights (e.g., example red lines 228 and 230) and biases (e.g., example yellow spheres 238 and 240) are shown connecting inputs (green cubes) through neuron hidden layers (gray planes) to outputs (blue cubes) in the neural networks. For example, conventional NN 202 has 2N inputs (e.g., inputs 210-212) and 2N outputs (e.g., outputs 214-216), while the Hamiltonian NN 204 has 2N inputs (e.g., inputs 220-222) and one output (e.g., output 224), but internalizes the output's gradient in its weights and biases. Further, in FIG. 2, conventional NN 202 is configured to intake positions and velocities $\{q, \dot{q}\}$ and outputs approximations to their time derivatives $\{\dot{q}, \ddot{q}\}$, thereby adjusting its weights and biases to minimize the loss $$\mathcal{L}_{NN}=(\dot{q}_t-\dot{q})^2+(\ddot{q}_t-\ddot{q})^2$$

until it learns the correct mapping. In contrast, Hamiltonian neural network 'HNN' 204 intakes position and momenta $\{q, p\}$, outputs the scaler function $\mathcal{H}$, takes one gradient to find its position and momentum rates of change, and minimizes the loss $$\mathcal{L}_{HNN}=(\dot{q}_t-\partial\mathcal{H}/\partial p)^2+(\dot{p}_t+\partial\mathcal{H}/\partial q)^2$$

which enforces Hamilton's equations of motion. For a given time step dt, each trained network can extrapolate a given initial condition with an Euler update $\{q, p\}\leftarrow\{q, p\}+\{\dot{q}, \dot{p}\}dt$ or some better integration scheme.

Loosely, a NN 202 learns the orbits, while HNN 204 learns the Hamiltonian. Geometrically, NN 202 learns the generalized velocities, the dual mappings $\{q, \dot{q}\}\rightarrow\dot{q}$ and $\{q, \dot{q}\}\rightarrow\ddot{q}$, while HNN 204 learns the Hamiltonian generator function, the single mapping $\{q, p\}\rightarrow\mathcal{H}$, whose (symplectic) gradient gives the generalized velocities $\{\dot{q}, \dot{p}\}$. With the same resources, HNN 204 outperforms NN 202, and the advantage grows as the phase space dimension increases, where q and p are multicomponent vectors.

Hénon-Heiles Example

Figure 4:
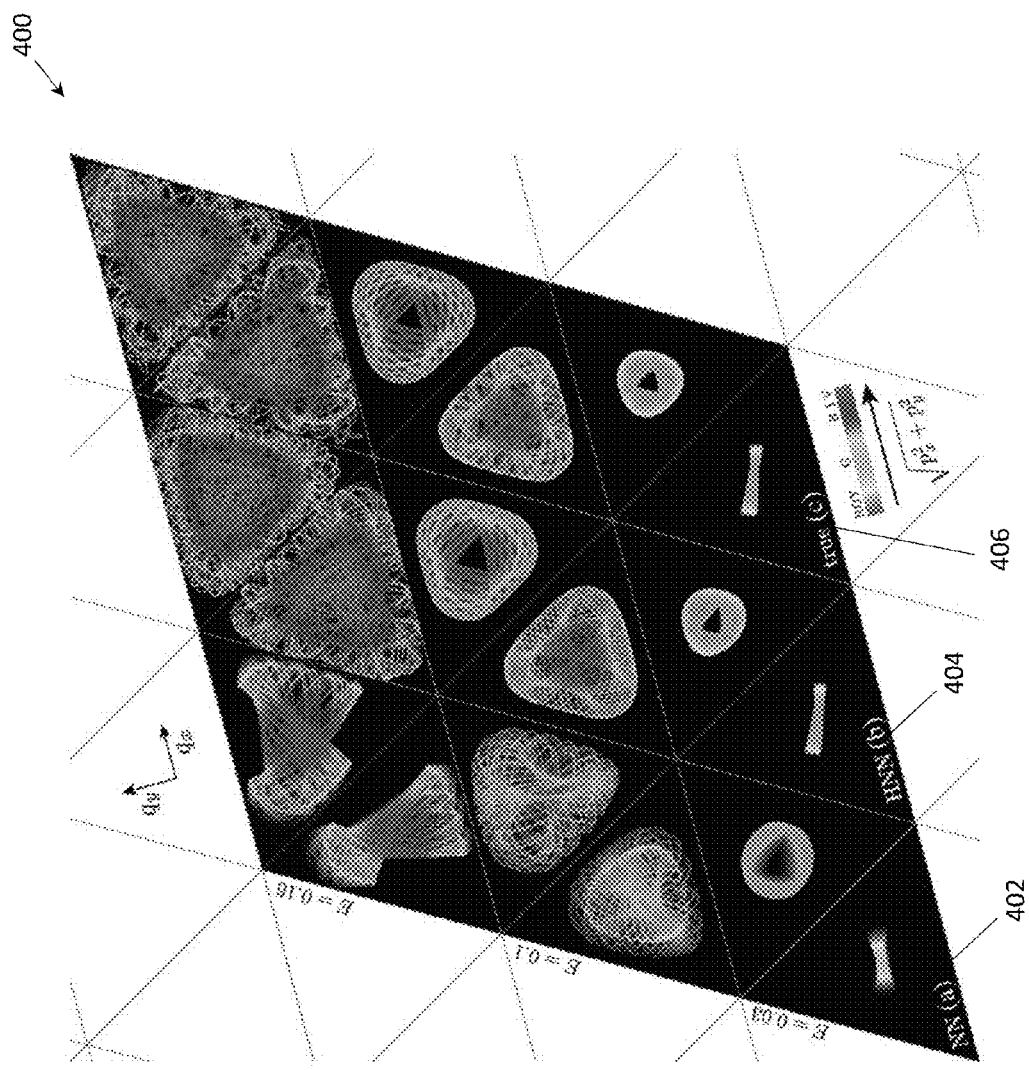
FIG. 4 illustrates exemplary Hénon-Heiles flows according to an embodiment of the subject matter described herein.

In some embodiments of the disclosed subject matter, neural networks may be "stress tested" on the Hénon-Heiles system, as its mixed phase space of order and chaos is an especially challenging dynamical scenario to identify and decipher. For selected bounded energies and for the same learning parameters detailed in table 300 shown in FIG. 3, the NN and HNN can be trained (e.g., by an artificial intelligence Hamiltonian (AIH) engine as described below) on multiple Hénon-Heiles trajectories starting in the triangular basin that enables bounded motion. Notably, table 300 presents exemplary Python neural network parameters and all corresponding values that were explored (with final results bolded). The neural networks can be used to forecast new trajectories and then compare them to the "true" trajectories obtained by numerically integrating the single Hamilton function presented above. FIG. 4, which depicts exemplary Hénon-Heiles flows, shows these results. HNN captures the nature of the global phase space structures well and effectively distinguishes qualitatively different dynamical regimes. NN forecasts are especially poor at high energies. Image 400 in FIG. 4 further depicts two sample Hénon-Heiles flows $\{q_x, q_y\}$ for different initial conditions forecast by conventional neural network 402, Hamiltonian neural network 404, and Hénon-Heiles differential equations 406, for small, medium, and large bounded energies $0<E<\frac{1}{6}$. The depicted hues in image 400 code momentum magnitudes, from red to violet, while orbit tangents code momentum directions. Orbits fade into the past. Notably, HNN's physics-informed forecasting is especially better than a NN's at high energies.

Figure 5:
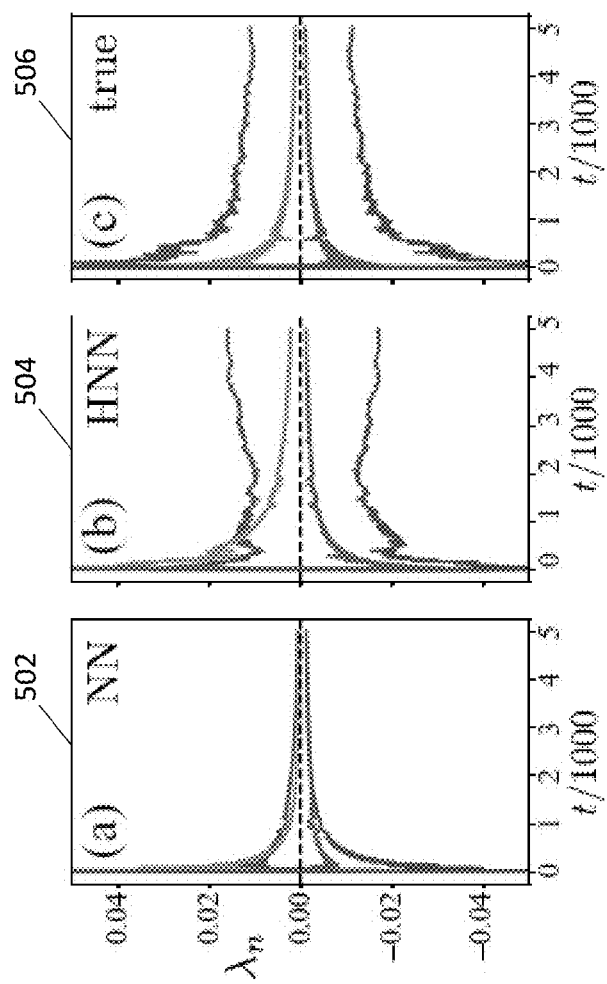
FIG. 5 illustrates an exemplary Lyapunov spectrum plots according to an embodiment of the subject matter described herein.
Figure 6:
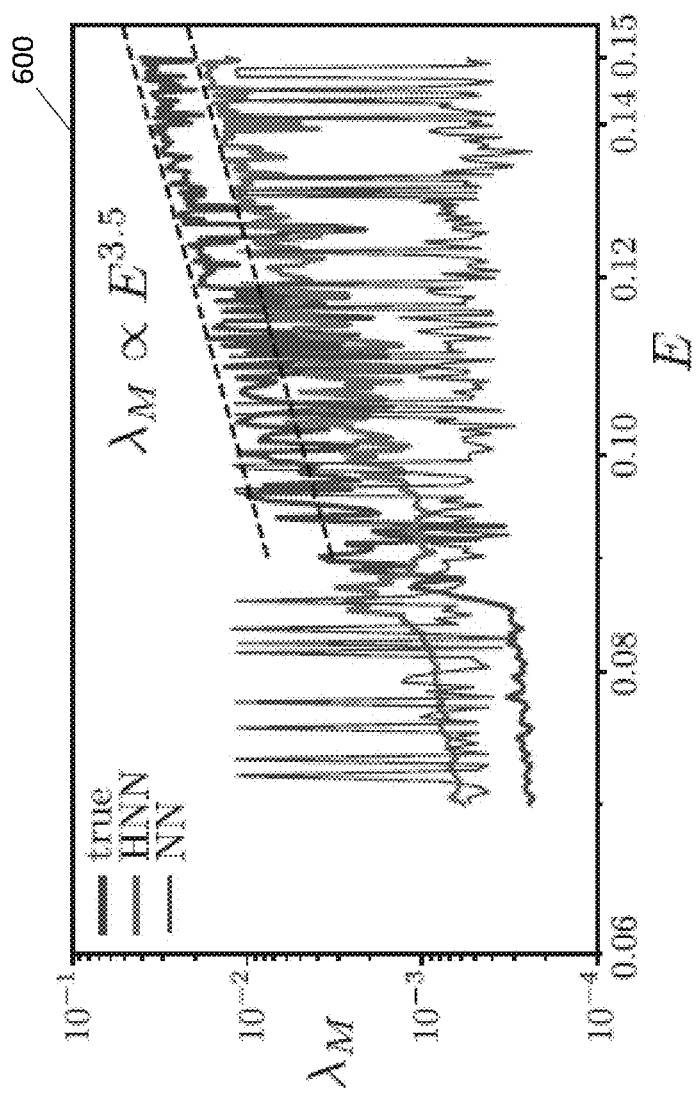
FIG. 6 illustrates an exemplary Lyapunov scaling plots according to an embodiment of the subject matter described herein.

To quantify the ability of NN and HNN to paint a full portrait of the global, mixed phase space dynamics, the NN's and HNN's knowledge of the system is used to estimate the Hénon-Heiles Lyapunov spectrum, which characterizes the separation rate of infinitesimally close trajectories, one exponent for each dimension. Since perturbations along the flow do not cause divergence away from it, at least one exponent will be zero. For a Hamiltonian system, the exponents exist in diverging-converging pairs to conserve phase space volume. Hence, a spectrum like $\{-\lambda, 0, 0, +\lambda\}$ is expected, as in FIG. 5, with the maximum exponent increasing at large energies like $\lambda \propto E^{3.5}$, as shown in FIG. 6. HNN satisfies both these expectations, which are nontrivial consistency checks that it has authentically learned a conservative flow similar to the Hénon-Heiles flow. NN satisfies neither check. For example, FIG. 5 depicts plots 502-506 illustrating a Lyapunov spectrum. Notably, FIG. 5 shows that integrating the variational equations estimates the Hénon-Heiles Lyapunov exponents $\lambda_n$ after time t for NN (see plot 502), HNN (see plot 504), and true (see plot 506) for an example initial condition. HNN better approaches the expected Hamiltonian spectrum $\{-\lambda, 0, 0, +\lambda\}$. Likewise, FIG. 6 illustrates a plot 600 representing Lyapunov scaling that illustrates the maximum Lyapunov exponent $\lambda_M$ versus energy E for NN, HNN, and true. HNN reproduces the correct energy exponent, while NN shows no trend at all.

Figure 7:
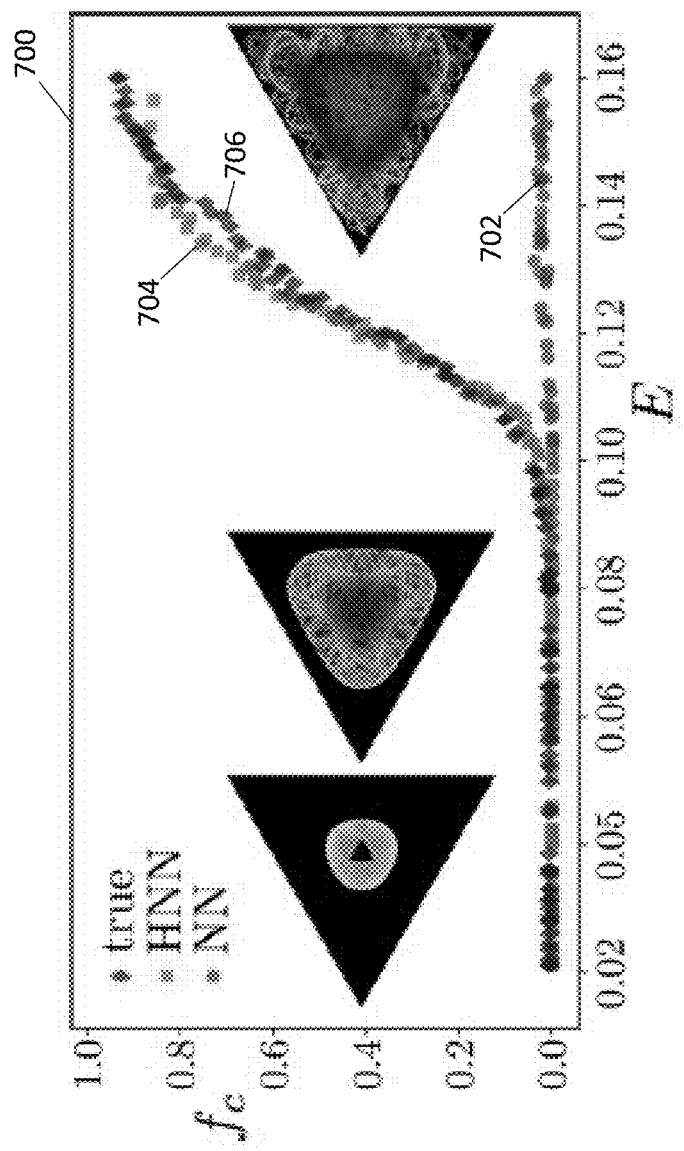
FIG. 7 illustrates an exemplary plot of an order to chaos transition according to an embodiment of the subject matter described herein.

Using NN and HNN, the smaller alignment index $\alpha$ can be computed. This index is a metric of chaos that allows one to quickly find the fraction of orbits that are chaotic at any energy. Further, $\alpha$ can be computed for a specific orbit by following the time evolution of two different normalized deviation vectors along the orbit and computing the minimum of the norms of their difference and sum. Via extensive testing, an orbit is chaotic if $\alpha<10^{-8}$, indicating that its deviation vectors have been aligned or anti-aligned by a large positive Lyapunov exponent. FIG. 7 shows the fraction of chaotic trajectories for each energy, including a distinct transition between islands of order at low energy and a sea of chaos at high energy. The chaos fractions computed with HNN forecasts are good at all energies, but those computed by NN forecasts are poor at high energies. In particular, FIG. 7 illustrates an order to chaos transition plot 700. Notably, the fraction of chaotic orbits $f_c$ for random energies E, as inferred by the smaller alignment index $\alpha$, for conventional neural network (e.g., green circles 702), Hamiltonian neural network (e.g., magenta squares 704), and Hénon-Heiles differential equations (e.g., blue diamonds 706). NN is especially poor for chaotic high-energy orbits (e.g., insets in plot 700 are sample orbits).

Figure 8:
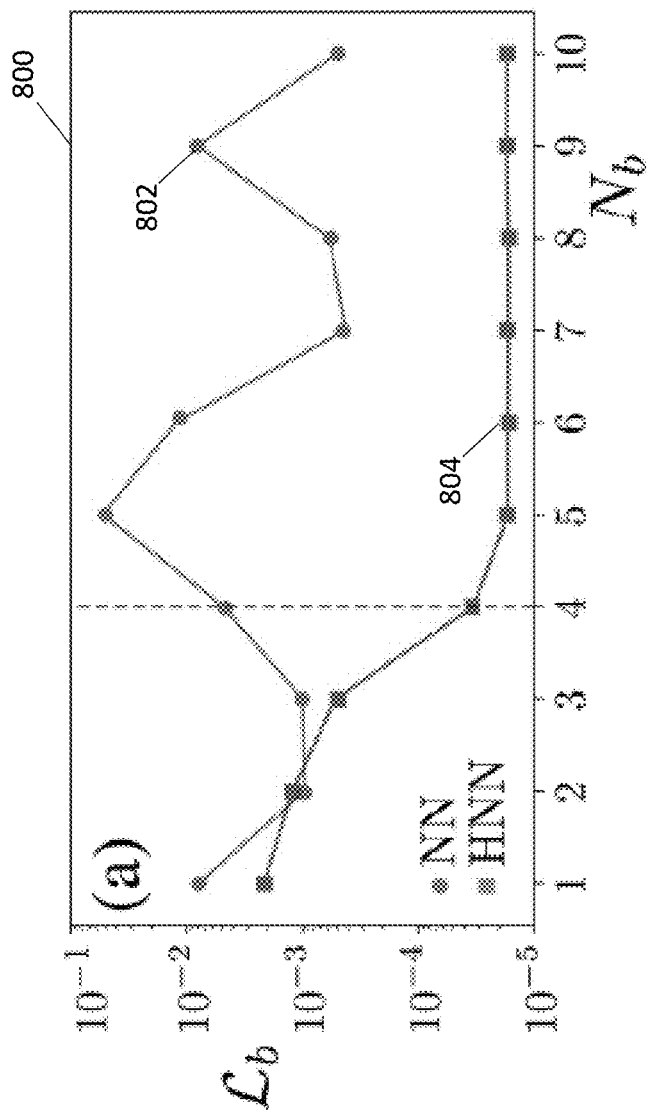
FIG. 8 illustrates a loss function diagram pertaining to a Hénon-Heiles system according to an embodiment of the subject matter described herein.
Figure 9:
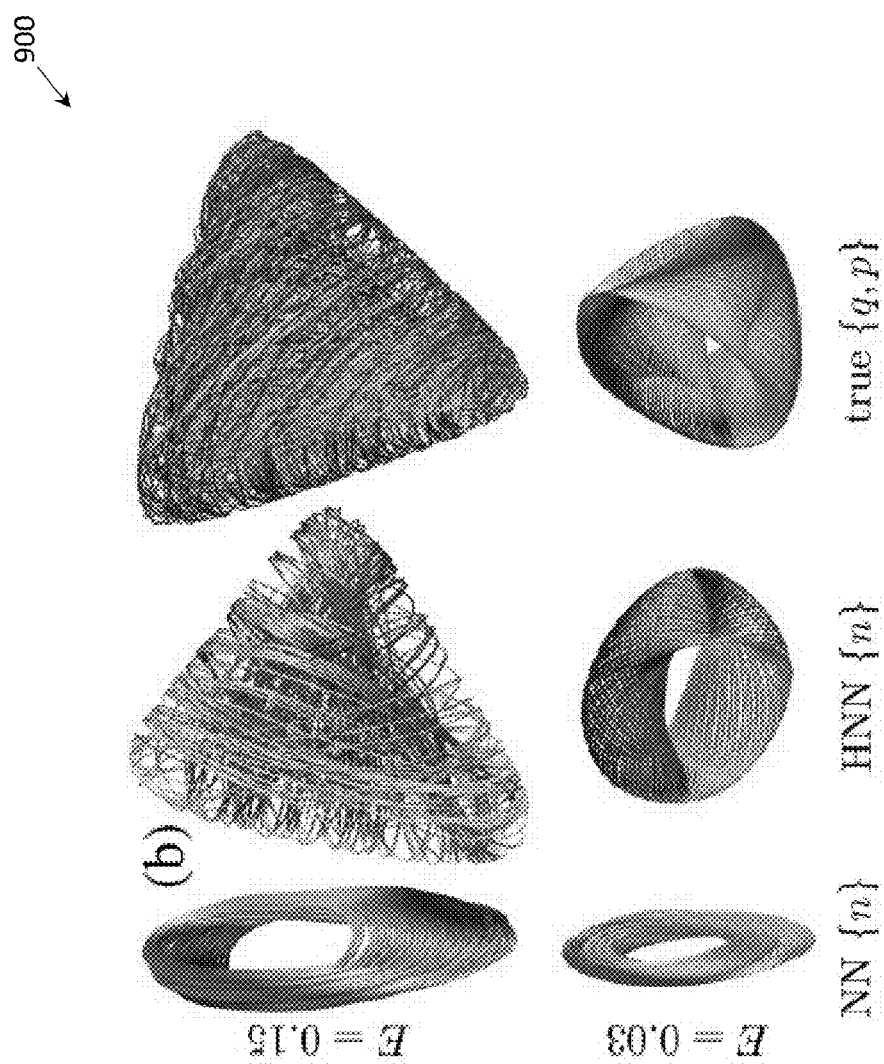
FIG. 9 illustrates an exemplary compressed representation of a Hamiltonian neural network according to an embodiment of the subject matter described herein.

To understand what NN and HNN have learned when these neural networks forecast orbits, an autoencoder (e.g., a neural network with a sparse "bottleneck" layer) is used to examine their hidden neurons. The autoencoder's mean-square-error loss function forces the input to match the output, so its weights and biases adjust to create a compressed, low-dimensional representation of the neural networks' activity, a process called introspection. For HNN, the loss function $L_b$ drops precipitously for $N_b=4$ (or more) bottleneck neurons, which appear to encode a combination of the four phase space coordinates, thereby capturing the dimensionality of the system, as shown in FIG. 8. Notably, NN shows no similar drop and the uncertainty in its loss function is orders of magnitude larger than HNN's. In particular, FIG. 8 depicts a plot 800 that illustrates the introspection corresponding to when an autoencoder compresses HNN forecasting, whose loss function $L_b$ (e.g., magenta squares 804) drops precipitously as its bottleneck layer increases past $N_b=4$ neurons, the dimensionality of the Hénon-Heiles system. When an autoencoder compresses NN forecasting, its loss function (e.g., green circles 802) wiggles irregularly, oblivious to this transition. Further, in FIG. 9, illustration 900 depicts HNN's compressed representation $\{n_1, n_2, n_3, n_4\}$ resembles the low-energy or high-energy orbit $\{q_x, q_y, p_x, p_y\}$ it is forecasting, where color indicates the fourth dimension. NN hardly notices the differences between the low-energy or high-energy orbits.

Billiards Example

Billiards can model a wide range of real-world systems, spanning lasers, optical fibers, ray optics, acoustic and microwave cavities, quantum dots, and nanodevices. Billiards also elucidates the subtleties of quantum-classical correspondence and the challenging notion of quantum chaos.

Figure 10:
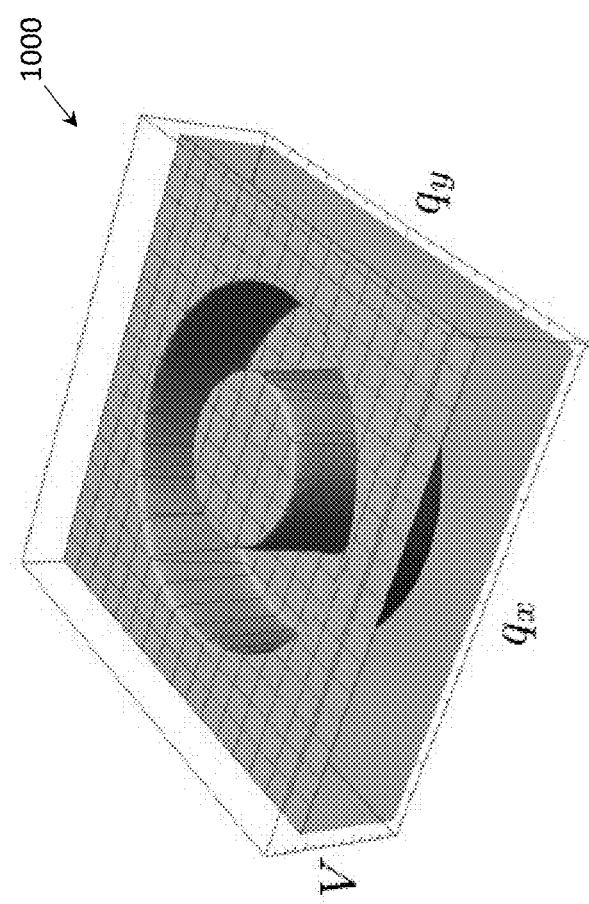
FIG. 10 illustrates an exemplary billiards potential energy representation according to an embodiment of the subject matter described herein.

Dynamicists typically idealize billiard tables with hard boundaries and discontinuous potentials. With similar phenomenology, billiard tables can be modeled with soft boundaries and continuous potentials, so the billiard balls' momenta change rapidly but continuously at each bounce. The Hamiltonian disclosed herein can be represented as:

$$\mathcal{H} = (p_x^2 + p_y^2)/2 + \mathcal{V}$$

with potential energy $$v_{[q_x, q_y]} = +\frac{1}{1 + e^{(r_o - \sqrt{q_x^2 + q_y^2}/\delta r)}} - \frac{1}{1 + e^{(r_i - \sqrt{(q_x + \delta q_x)^2 + q_y^2}/\delta r)}}$$

where $r_o$ is the radius of the outer circle, $r_i$ is the radius of the inner circle, $\delta q_x$ is the shift of the inner circle, and $\delta r$ is the softness of the walls, as shown in plot 1000 of FIG. 10. Notably, plot 1000 illustrates the potential energy versus position for circular billiards.

Figure 11:
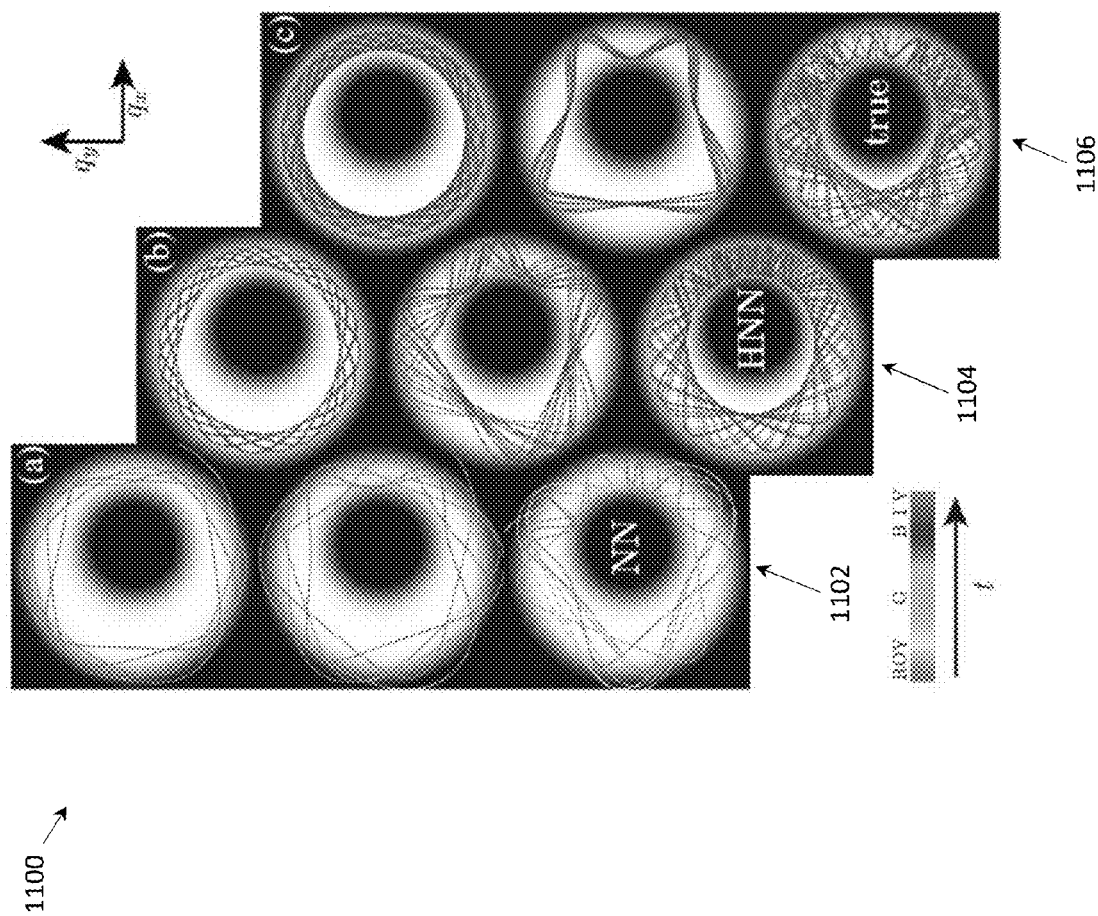
FIG. 11 illustrates a plurality of exemplary billiards flows according to an embodiment of the subject matter described herein.

The billiard tables are bounded by two circles, and the dynamics exhibits fascinating transitions as the circles resize or shift. Ordered and chaotic trajectories coexist for different initial conditions at the same energy. Plot 1100 of FIG. 11 shows typical trajectories, where grays code potential and the colors code time. For example, the plot depicts three sample billiard flows $\{q_x, q_y\}$ for different initial conditions, regular and bouncing from the outer circle only, regular and bouncing from both circles, and chaotic, forecast by conventional neural network (see section 1102), Hamiltonian neural network (see section 1104), and billiard differential equations (see section 1106). As indicated in plot 1000, the hues code time, from red to violet. Further, HNN physics bias significantly improves its dynamics forecasting over NN, which typically diverges after short times (and low-frequency colors). After identical training, HNN easily outperforms NN, which often forecasts energy-violating escapes at early times (low-frequency colors).

OTHER EXAMPLES

Figure 12:
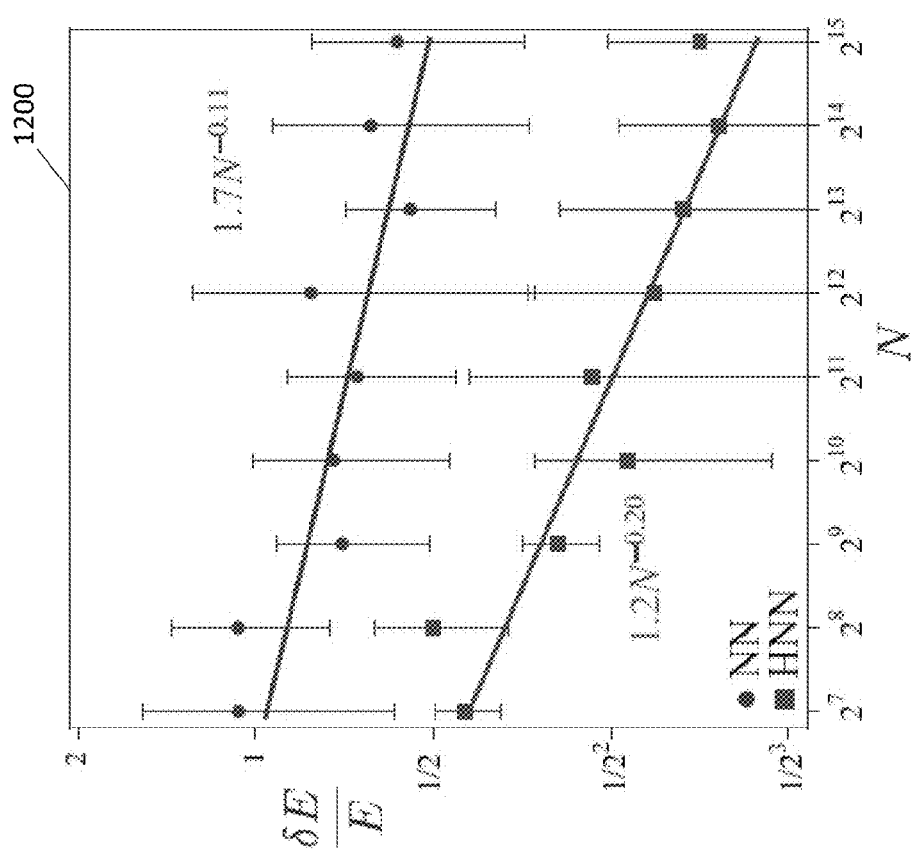
FIG. 12 illustrates a plot of the relative energy of a double pendulum according to an embodiment of the subject matter described herein.

The disclosed subject matter has demonstrated the efficient forecasting of Hamiltonian neural networks in diverse systems, both perturbative, like Hénon-Heiles with $\mathcal{H} = \mathcal{H}_0 + \epsilon \mathcal{H}_1$, and nonperturbative, like dynamical billiards. Other successful implementations include higher-dimensional Hénon-Heiles, and simple harmonic oscillators and pendulums with noisy training data. The disclosed subject matter has successfully used Hamiltonian neural networks to learn the dynamics of librating (back-and-forth) and rotating (end-over-end) single, double, and triple pendulums. The angles of rotating pendulums diverge, which makes them difficult for neural networks to learn. Consequently, the disclosed subject matter compactifies the pendulum phase space by wrapping it into a cylinder. It has been determined that both NN and HNN can learn the pendulums, and that the learning improves with the number of training pairs, but HNN is significantly better, as shown in plot 1200 in FIG. 12 for the double pendulum. Namely, plot 1200 illustrates a relative energy plot for a double pendulum where the relative energy error $\delta E/E$ for forecasted orbits versus number of training pairs N for a double pendulum averaged over six different initial distributions of weights and biases for NN and HNN is shown. Power-law fits guide the eye, and HNN's advantage grows with training pairs in plot 1200.

In some embodiments, the baseline neural network NN and Hamiltonian neural network HNN (which will also be referenced herein as an Advanced Hamiltonian Neural Network (AHNN)) can be implemented in the Python programming language using the PyTorch open source machine learning library. Table 300 in FIG. 3 summarizes the parameters used to train the disclosed neural networks. For example, on a 12-core desktop CPU, the disclosed model (e.g., an Artificial Intelligence Hamiltonian (AIH) engine as described below and illustrated in FIG. 37) takes approximately three hours to reach the desired training accuracy without any GPU acceleration. Notably, in the Python implementation, HNN significantly outperforms NN. FIG. 13 depicts an algorithm 1300 for generating orbit from a learned model. Likewise, FIG. 14 depicts an algorithm 1400 that depicts an exemplary model update subroutine. Notably, algorithms 1300 and 1400 outline how trajectories are generated using learned neural nets. Parameters 'NN.Forward' and 'HNN.Forward' in algorithm 1400 are simply the conventional feed-forward pass for NN and HNN, respectively.

In some embodiments, the disclosed subject matter is further configured to scale physics informed machine learning with data interventions. Notably, the relative error scales quantitatively with dimensionality and number of training data. For example, the AIH engine can quantify the manner in which incorporating physics into a neural network design can significantly improve the learning and forecasting of dynamical systems, even nonlinear systems of many dimensions. Conventional neural networks and Hamiltonian neural networks can be trained on increasingly difficult dynamical systems. Further, the forecasting errors of these neural networks can be computed as the number of training data and number of system dimensions vary.

As indicated above, artificial neural networks are powerful tools being developed and deployed for a wide range of uses, especially for classification and regression problems. The artificial neural networks can approximate continuous functions, model dynamical systems, elucidate fundamental physics, and master strategy games. Notably, the scope of artificial neural networks can be extended by exploiting the symplectic structure of Hamiltonian phase space to forecast the dynamics of conservative systems that mix order and chaos.

Although recurrent neural networks have been used to forecast dynamics, the disclosed subject matter pertains to the ubiquitous feed-forward neural networks, especially as these neural networks learn dynamical systems of increasingly high dimensions. The ability of neural networks to learn high-dimensional dynamical systems accurately and efficiently is an important challenge for deep learning, as real-world systems are necessarily multi-component and thus typically high-dimensional. Conventional neural networks often perform significantly worse when encountering high-dimensional systems. As such, this can render conventional NNs to limited use in complex real-world scenarios that comprise many degrees of freedom. Thus, it is crucial to find methods that scale and continue to efficiently and accurately learn and forecast dynamics under increasing dimensionality.

As described herein, the AIH engine can be configured to implement, instantiate, executes, train, or manage the AHNN method (e.g., the AHNN), a conventional NN, and/or a HNN. For example, the AIH engine can conduct the systematic training of conventional and Hamiltonian neural networks on increasingly difficult dynamical systems, including linear and nonlinear oscillators and a coupled bistable chain. The AIH engine can also be configured to compute the forecasting errors of NNs or HNNs as the number of training data vary and the number of system dimensions vary. The disclosed can be configured to provide an alternate map-building perspective to understand and elucidate how HNNs learn differently from conventional NNs. In particular, the significant advantages offered by HNNs in learning and forecasting high-dimensional systems is demonstrated. The pivotal concept is that HNNs learn the single energy surface, while NNs learn the tangent space (where the derivatives are), which is more difficult for the same training parameters. As the number of derivatives increase with the dimension, so too do the advantages afforded by the HNN.

The AIH engine further assesses whether the advantage of neural-network inductive biases grows or shrinks with problem complexity. It achieves this goal by systematically varying the dimension of the system and the amount of training data while measuring the performance of a Hamiltonian neural network relative to a baseline neural network.

In some embodiments, a neural network is a nonlinear function that can be represented as:

$$o = F[i, w] = F_w[i]$$

that converts an input i to an output o according to its (typically very many) weights and biases w. Training a neural network with input-output pairs repeatedly updates the weights and biases by:

$$w \leftarrow w - \eta \frac{\partial C}{\partial w}$$

to minimize a cost function C, where η is the learning rate, with the expectation that the weights and biases approach their optimal values w→ŵ.

Figure 15:
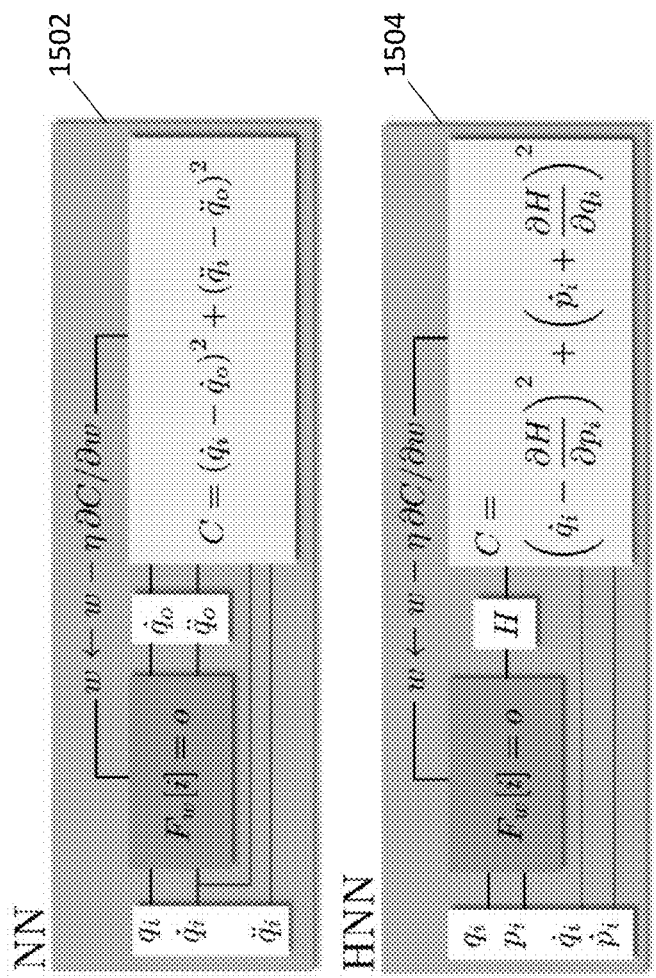
FIG. 15 illustrates an exemplary schematics for dynamics neural networks according to an embodiment of the subject matter described herein.

A conventional NN learning a dynamical system may be configured to intake a position and velocity (hand eh, output a velocity and acceleration $\dot{q}_o$ and $\ddot{q}_o$, and adjust the weights and biases to minimize the squared difference:

$$C = (\dot{q}_i - \dot{q}_o)^2 + (\ddot{q}_i - \ddot{q}_o)^{2|}$$

and ensure proper dynamics, as in the neural network 1502 of FIG. 15. After training, NN 1502 can intake an initial position and velocity and evolve the system forward in time using a simple Euler update (or some better integration algorithm). Notably, FIG. 15 illustrates dynamics neural network schematics for NN 1502 and HNN 1504. Output o of each network is a non-linear function F of its input i and its weights and biases w, which adjust during training with learning rate η to minimize a cost function C. A conventional neural network (NN) intakes positions $q_i$ and velocities $\dot{q}_i$, outputs velocities $\dot{q}_o$ and accelerations $\ddot{q}_o$, and needs input accelerations $\ddot{q}_i$ to compute costs in NN 1502. Similarly, Hamiltonian neural network (HNN) 1504 intakes positions $q_i$ and momenta $p_i$, outputs only the energy H, but needs velocities $\dot{q}_i$ and forces $\dot{p}_i$ to compute costs.

To overcome limitations of conventional neural networks, especially when forecasting dynamical systems, recent neural network algorithms have incorporated ideas from physics. In particular, incorporating the symplectic phase space structure of Hamiltonian dynamics has proven very valuable. A Hamiltonian neural network (HNN) learning a dynamical system intakes position and momentum $q_i$ and $p_i$ but outputs a single energy-like variable H, which it differentiates according to Hamilton's recipe.

$$\dot{q}_o = -\frac{\partial H}{\partial p_i},$$

$$\dot{p}_o = -\frac{\partial H}{\partial q_i},$$

as shown in HNN 1504 of FIG. 15. Minimizing the HNN cost function $$C = (\dot{q}_i - \dot{q}_o)^2 + (\dot{p}_i - \dot{p}_o)^2$$

then assures symplectic dynamics, including energy conservation and motion on phase space tori. So rather than learning the derivatives, HNN 1504 learns the Hamiltonian function which is the generator of trajectories. Since the same Hamiltonian function generates both ordered and chaotic orbits (e.g., ordered and chaotic behavior), learning the Hamiltonian allows the network to forecast orbits outside the training set. In fact, HNN 1504 has the capability of forecasting chaos even when trained exclusively on ordered orbit data.

The HNN can also be configured to utilize a linear oscillator. For a simple harmonic oscillator with mass m=1, stiffness k=1, position q, and momentum p, the Hamiltonian can be represented as $$H = \frac{p^2}{2m} + \frac{1}{2}kq^2 = \frac{1}{2}p^2 - \frac{1}{2}q^2.$$

so Hamilton's equations $$\dot{q} = +\frac{\partial H}{\partial p} = +p.$$

$$\dot{p} = -\frac{\partial H}{\partial q} = -q$$

imply the linear equation of motion $$\ddot{q} = -q.$$

Figure 16:
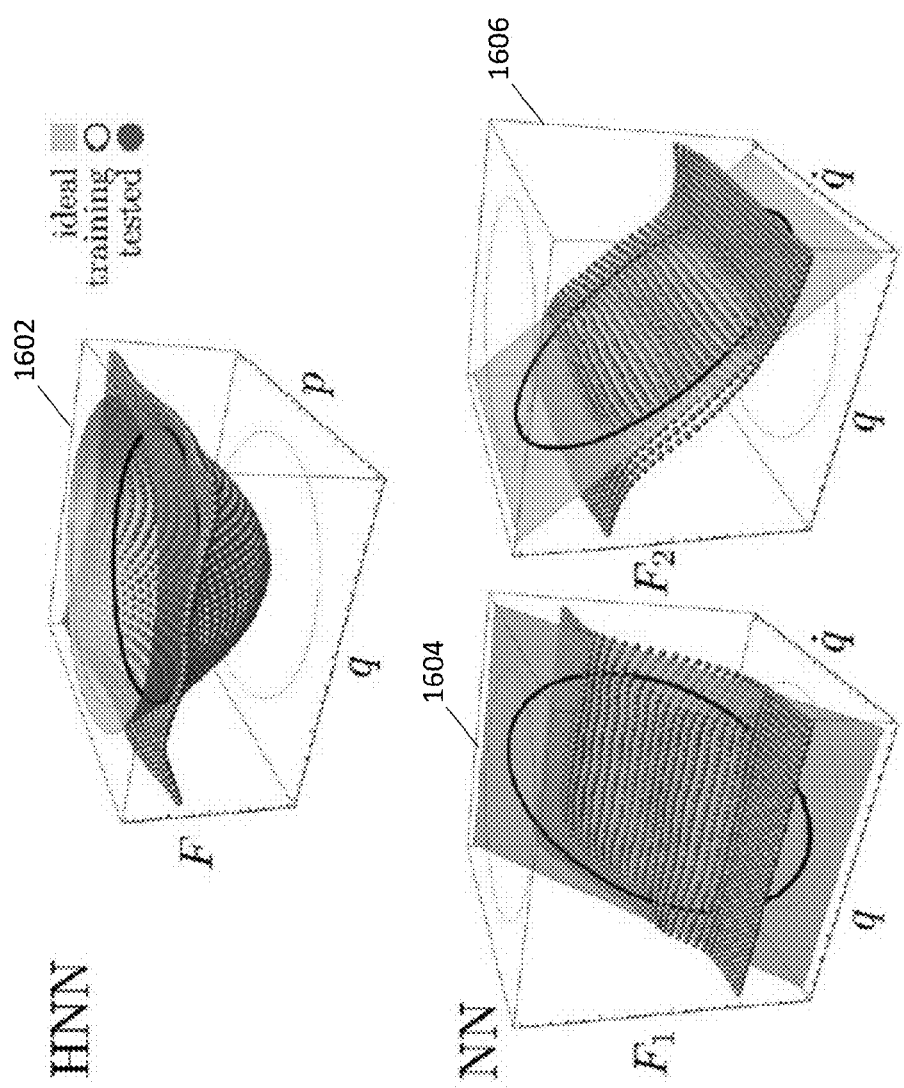
FIG. 16 illustrates exemplary plots for comparing neural network mappings according to an embodiment of the subject matter described herein.

The HNN can map its input to the paraboloid (i.e., 'HNN mapping equation')

$$F_{\hat{w}} = [[q, p]] = H = \frac{q^2 + p^2}{2} = F.$$

but the NN maps its input to two intersecting planes (i.e., 'NN mapping equation'))

$$F_{\hat{w}}[\{q,\dot{q}\}] = \partial_t\{q,\dot{q}\} = \{\dot{q}, -q\} = \{F_1, F_2\},$$

as illustrated by the cyan surfaces in FIG. 16. In particular, FIG. 16 illustrates exemplary plots for comparing neural network mappings according to an embodiment of the subject matter described herein. For example, the HNN maps inputs to (via the 'HNN mapping equation' presented above) the paraboloidal energy surface (e.g., plot 1602) whose gradient stores the velocity $\dot{q}$ and force $\ddot{q} = -q$. The NN plots maps linear oscillator inputs to two separate planes (e.g., plots 1604 and 1606) whose heights are the velocity $\dot{q}$ and acceleration $\ddot{q} = -q$ (as indicated above in the 'NN mapping equation'). Cyan surfaces are targets, training pairs are inside blue circles, red dots are trained tests. Notably, training improves both neural networks.

The AIH engine implements the neural networks in Mathematica using symbolic differentiation. The HNN and NN train using the same parameters as shown in table 1702 in FIG. 17, including two hidden layers of 32 neurons each. The HNN and NN can be trained for a range of energies 0<E<1 and times 0<t<2π, and test for times 0<t<16π. The HNN maps the parabolic energy well, while the NN has some problems mapping to the two planes, especially for large and small speeds, as shown in FIG. 16, were cyan surfaces are the ideal targets and red dots are the actual mappings. Training pairs are confined to inside the blue circle, and extrapolation outside is not good in either case, but further training improves both.

Figure 18:
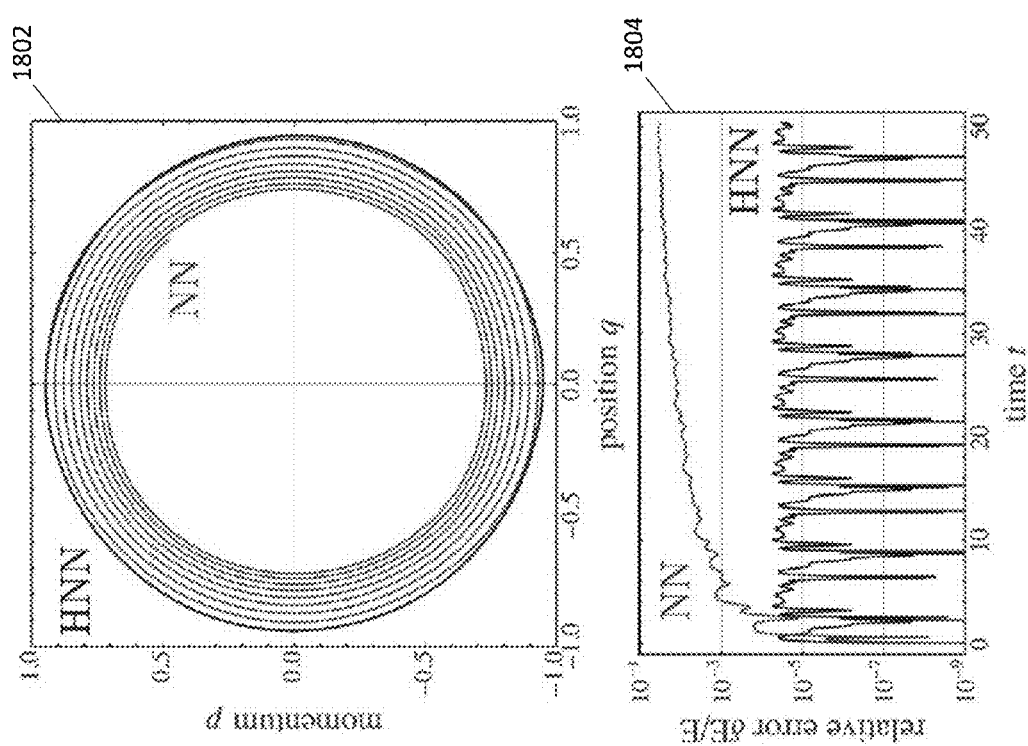
FIG. 18 illustrates exemplary plots representative of linear oscillator forecasting according to an embodiment of the subject matter described herein.

In plot 1802 of FIG. 18, HNN phase space orbit creates a closed circle, while NN phase space orbit slowly spirals in. In plot 1804, the HNN orbit conserves energy to within 0.01%, while the NN orbit loses energy by almost 10%, for times 0<t<16π.

High-Dimensional Oscillators

More generally, in d spatial dimensions and 2d phase space, the quadratic oscillator Hamiltonian $$H_2 = \sum_{n=1}^{d} \left(\frac{1}{2}p_n^2 + \frac{1}{2}q_n^2\right)$$

has a linear restoring force, but the d-dimensional quartic oscillator $$H_4 = \sum_{n=1}^{d}\left(\frac{1}{2}p_n^2 + \frac{1}{4}q_n^4\right)$$

has a nonlinear restoring force.

In some embodiments, the AIH engine implements the neural networks in Python using automatic differentiation. The HNN and NN can train with the same parameters, some of which are optimized as in table 1704 shown in FIG. 17, including two hidden layers of 32 neurons. The HNN and NN train for a range of energies $0<E<1$ and times $0<t<100$. We compute the energy mean relative error $\delta E/E$ of each forecasted orbit, which is further averaged over 64 training sessions, each starting with a unique set of initial weights and biases w. For each dimension d, the error $\delta E/E$ is plotted versus the number of training pairs N.

Figure 19:
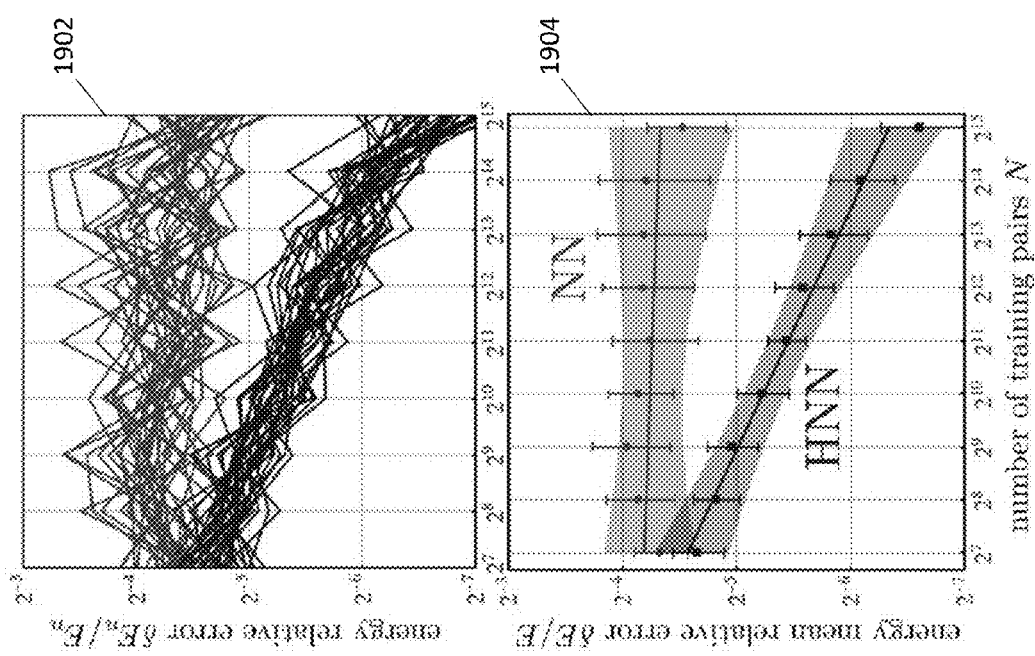

FIG. 19 summarizes the linear oscillator results for dimension d=6. Raw errors in plot 1902 suggest variance, and mean errors with 95% confidence band in plot 1904 indicate variance. The HNN has smaller variance and improves dramatically with increasing training, in this case like the power law $$\frac{\delta E}{E} \sim 0.12 N^{-0.22}.$$

Figure 20:
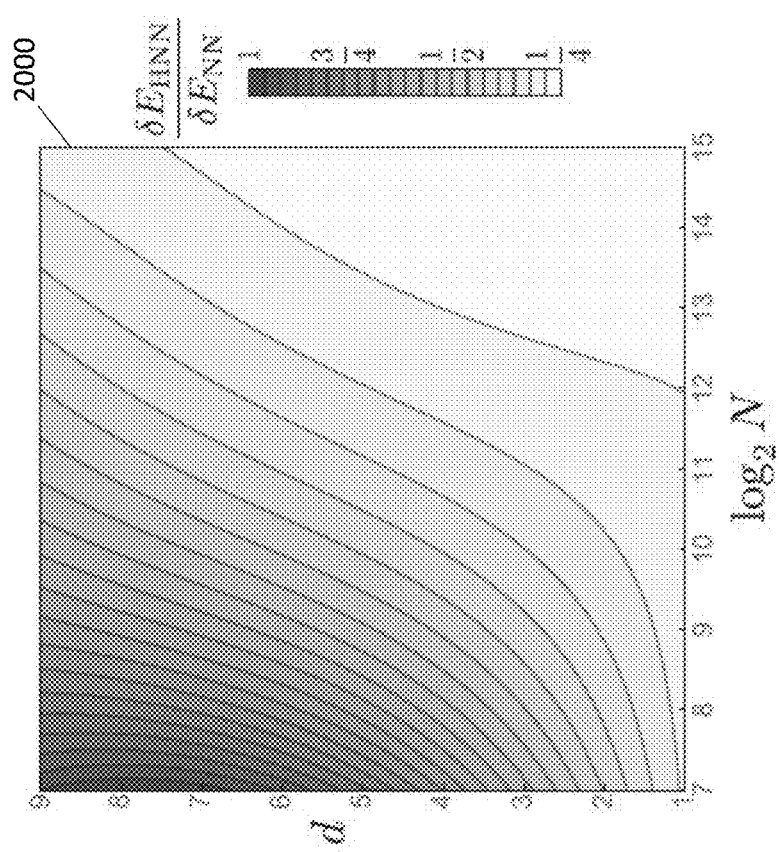

The forecasting error analysis is repeated for dimensions $1 \le d \le 9$. Notably, the HNN maintains its forecasting edge over the NN in high dimensions, as summarized by the smoothed contour plot 2000 in FIG. 20. For example, FIG. 20 depicts the smoothed linear forecasting energy error ratio. In particular, the HNN is up to four times better than the NN in forecasting the linear oscillator in this domain of number of dimensions d versus number of training pairs N. Each network trains 32 times from different initial weights and biases and then forecasts 32 different orbits.

Figure 21:
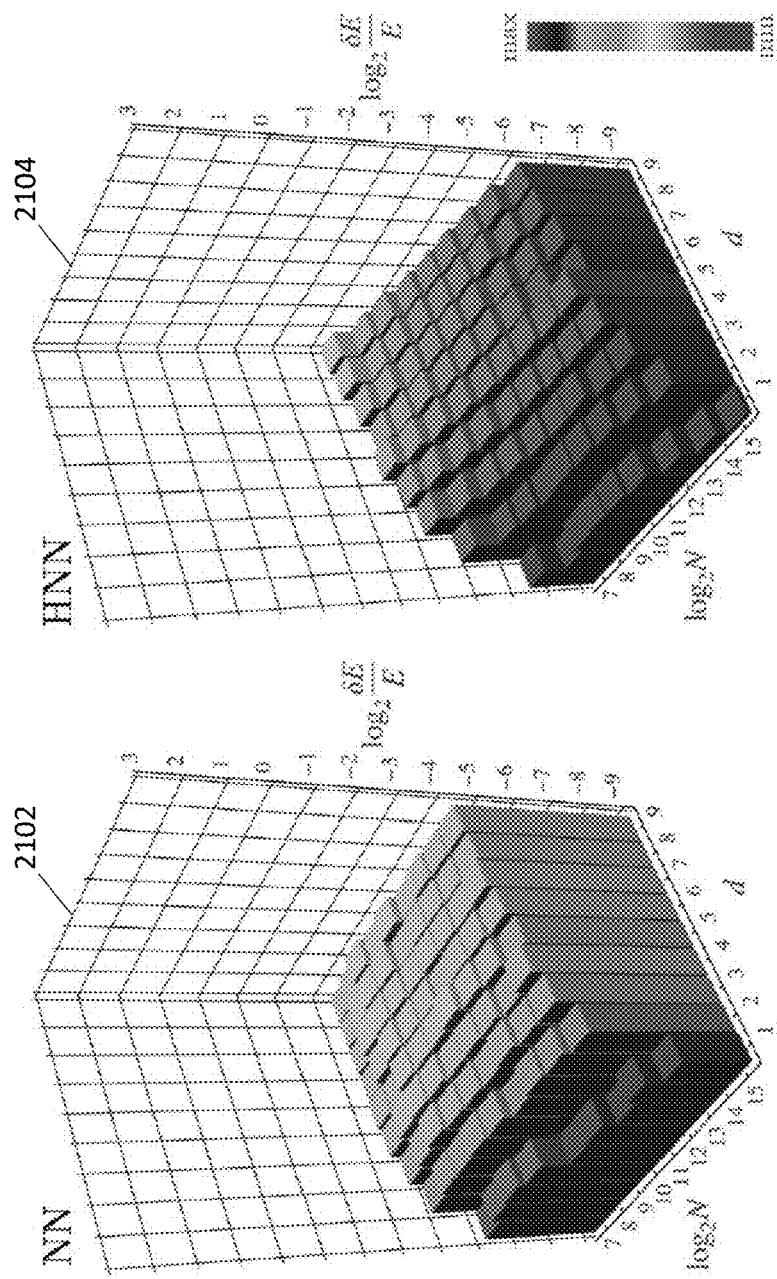

Likewise, the heights and rainbow hues depicted in FIG. 21 code energy mean relative errors. Specifically, linear oscillator energy mean relative error $\delta E/E$ versus number of training pairs N versus dimension d, for the NN (see plot 2102) and HNN (see plot 2104). Each network trains and forecasts 64 times from different initial weights and biases. In this domain, HNN forecasts four times better than the NN. Moreover, the NN rapidly loses accuracy with dimension for all tested training pairs as shown in plot 2102. In contrast, plot 2104 depicts the HNN slowly losing accuracy with dimension but recovers it with training pairs.

Figure 22:
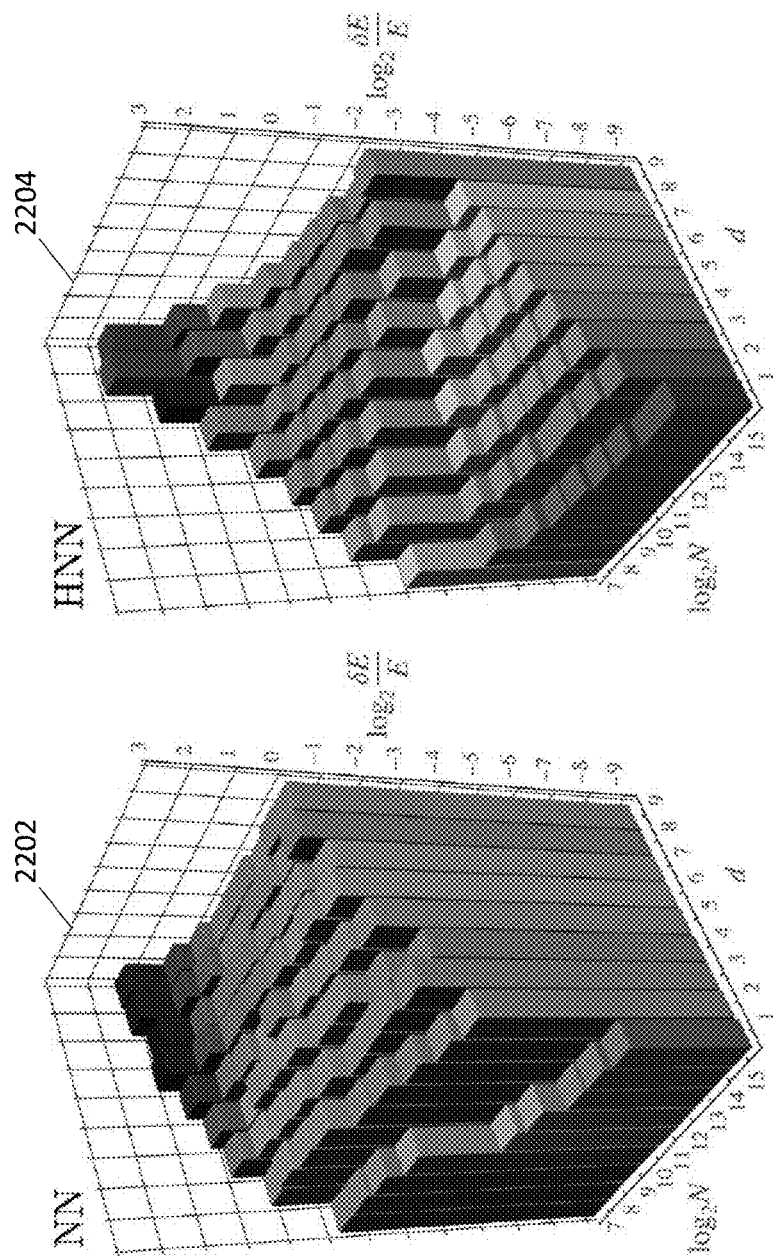

Next, the forecasting error analysis is repeated for nonlinear oscillators, as shown in FIG. 22. Although nonlinear oscillator is harder to learn, the HNN still delivers good forecasts for sufficiently many training pairs. FIG. 22 depicts the nonlinear oscillator energy mean relative error $\delta E/E$ versus number of training pairs N versus dimension d, for NN (see plot 2202) and HNN (see plot 2204). Each network trains and forecasts 64 times from different initial weights and biases. Rainbow hues code heights with same scale as FIG. 21. In this domain, HNN forecasts 20 times better than NN.

Bistable Chain Example

Figure 23:
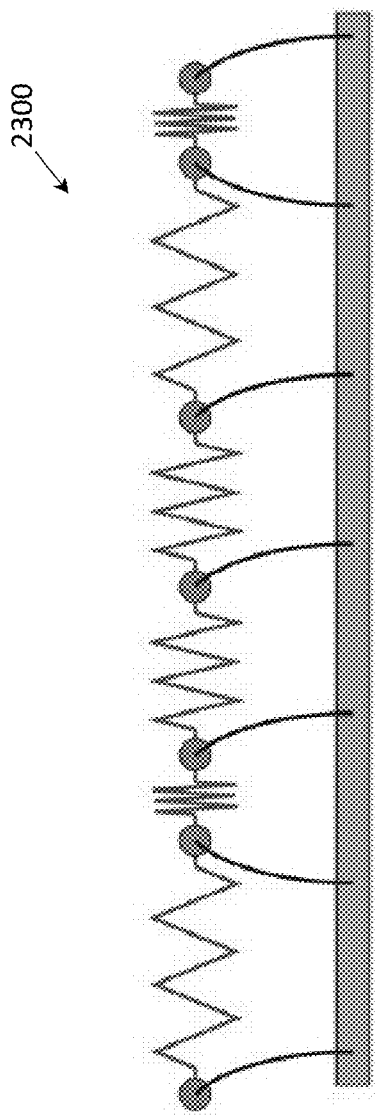

Consider a chain of coupled bistable oscillators as shown in schematic 2300 of FIG. 23, where top-heavy hacksaw blades joined by Hooke's law springs swing back-and-forth between their dual sagging equilibria. In FIG. 23, hacksaw blades (black) are stuck vertically into a piece of wood (brown) with small masses (blue) attached at the tops. Vertical is an unstable equilibrium and each blade sags left or right forming a bistable system. Notably, the width of the blade prevents it from sagging into or out of the drawing. Linear springs (red) couple the masses in FIG. 23.

The AHNN can model each blade by the nonlinear spring force $$f[q] = aq - bq^3$$

with a, b>0. The corresponding potential $$V[q] = -\int f[q]dq = -\frac{1}{2}aq^2 + \frac{1}{4}bq^4$$

has an unstable equilibrium at q=0 and stable equilibria at $q = \pm\sqrt{a/b}$. The AHNN can be configured to couple adjacent masses by linear springs of stiffness $\kappa$. For d identical masses m=1, the Hamiltonian $$H_c = \sum_{n=1}^{d}\left(\frac{1}{2}p_n^2 + V[q_n] + \frac{1}{2}\kappa(q_n - q_{n+1})^2\right).$$

Hamilton's equations imply $$\dot{q}_n = p_n,$$
$$\dot{p}_n = V'[q_n] + \kappa(q_{n-1} - q_n) + \kappa(q_{n+1} - q_n)$$
$$= aq_n - bq_n^3 + \kappa(q_{n-1} - 2q_n + q_{n+1}).$$

Enforce free boundary conditions by demanding $$q_0 = q_1.$$
$$q_{d+1} = q_d.$$

Figure 24:
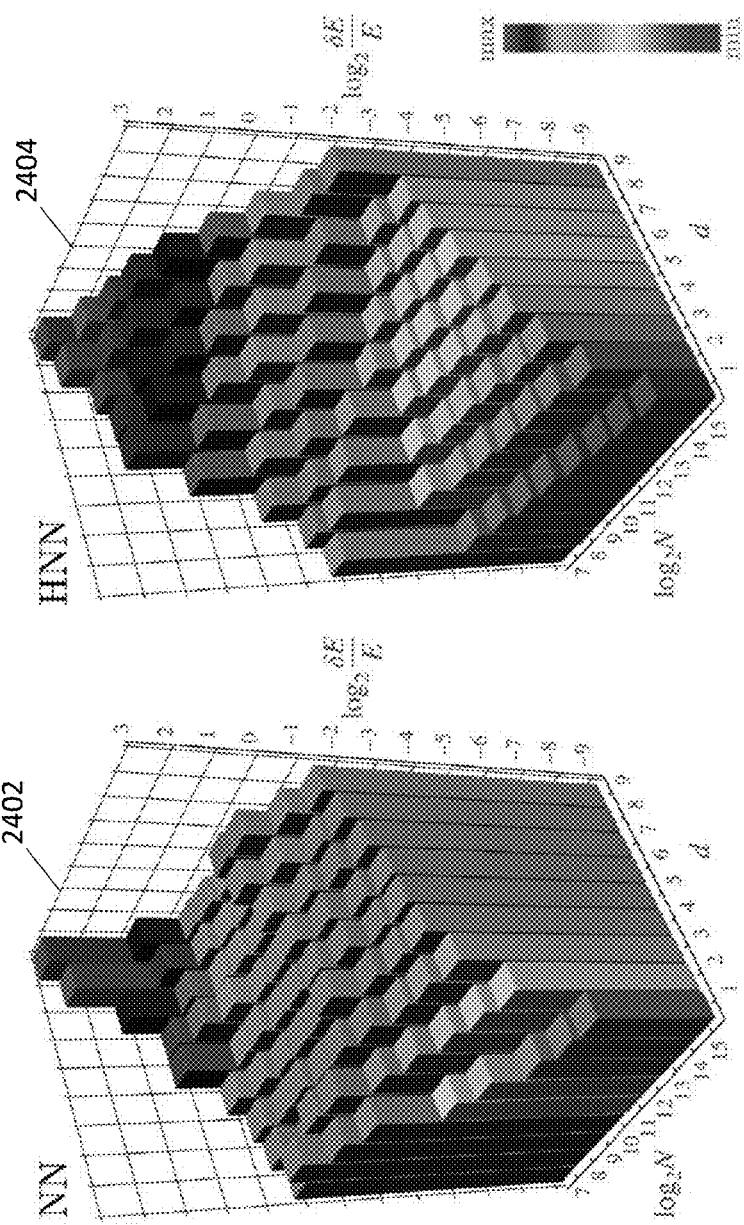

As with the uncoupled high-dimensional systems, for sufficiently many training pairs, the HNN significantly outperforms the NN in forecasting the bistable chain, as shown in FIG. 24. Notably, FIG. 24 depicts the bistable chain energy mean relative error $\delta E/E$ versus number of training pairs N versus dimension d, for the NN (see plot 2402) and the HNN (see plot 2404). Each network trains and forecasts 64 times from different initial weights and biases. In FIG. 24, heights and rainbow hues code energy errors with same scale as FIGS. 21 and 22. In this domain, HNN forecasts 9 times better than NN. For sufficiently few training pairs, NN appears to occasionally outperform HNN. While the HNN must learn to map just the single energy surface, the HNN must learn the surface well enough to estimate its gradient (which stores the velocities and forces), and this requires sufficient training. But when the NN outperforms HNN, as in the FIG. 24 low-N high-d back corner, neither network learns well, and the best strategy is to increase the number of training pairs and use the HNN.

Conventional neural networks are universal function approximators, but these neural networks may impractically require significant amounts of training data to approximate nonlinear dynamics. The disclosed Hamiltonian neural networks can efficiently learn and forecast dynamical systems that conserve energy, but these HNNs require special inputs called canonical coordinates, which may be hard to infer from data. In some embodiments, the AIH engine can be configured by prepending a conventional neural network to a Hamiltonian neural network and show that the combination (e.g., a "generalized Hamiltonian neural network (gHNN)" accurately forecasts Hamiltonian dynamics from generalized noncanonical coordinates. In some embodiments, the gHNN is a sub-method and/or subcomponent of the AHNN described herein. Examples may include a predator-prey competition model where the canonical coordinates are nonlinear functions of the predator and prey populations, an elastic pendulum characterized by nontrivial coupling of radial and angular motion, a double pendulum each of whose canonical momenta are intricate nonlinear combinations of angular positions and velocities, and real-world video of a compound pendulum clock.

Specifically, Hamiltonian neural networks typically train on canonical variables (e.g., positions and their conjugate momenta) that might not be known or accessible experimentally. In order to overcome the limitations and complexity of prior approaches, the disclosed subject matter can be configured to demonstrate a general extension of HNN, which utilizes a neural network preprocessor to i) train on a set of readily observable generalized coordinates, ii) learn the underlying Hamiltonian, and then iii) accurately forecast the dynamics, even if the training data is contaminated by noise. Example systems include the Lotka-Volterra predator-prey model, which unexpectedly can be converted into a Hamiltonian system by a nonlinear variable change, and an elastic pendulum, whose conjugate momenta are nonlinear combinations of its generalized coordinates. Other examples includes an even more generic and complicated nonlinear double pendulum and a wooden pendulum clock recorded with a hand-held video camera.

Neural Network Models

In conventional feed-forward artificial neural networks, the activity of neurons in one layer $$a_l \stackrel{\text{vec}}{=} \sigma[\omega_l a_{l-1}+b_l]$$

is a vectorized sigmoid function of a linear combination of the activities in the previous layer, where table 2500 in FIG. 25 summarizes the symbols used herein. The concatenation of such functions eliminates the activities leaving the nonlinear input-output function $$y=f[x,\omega]=y_\omega[x],$$

where the weights and biases $\omega=\{\omega_l, b_l\}$. Given many training pairs $\tau=\{x_n, y_n\}$ and a "loss" function like the mean-square-error $$L_\omega=\|y-f[x,\omega]\|^2,$$

an optimization algorithm like stochastic gradient descent finds the best weights and biases $$\hat{w}_\tau = \underset{w}{\mathrm{argmin}}\, L_w,$$

and the trained neural network $$y=f[x,\hat{\omega}_\tau]$$

approximates the desired function y[x].

Conventional Neural Network for Dynamics (NN)

Figure 26:
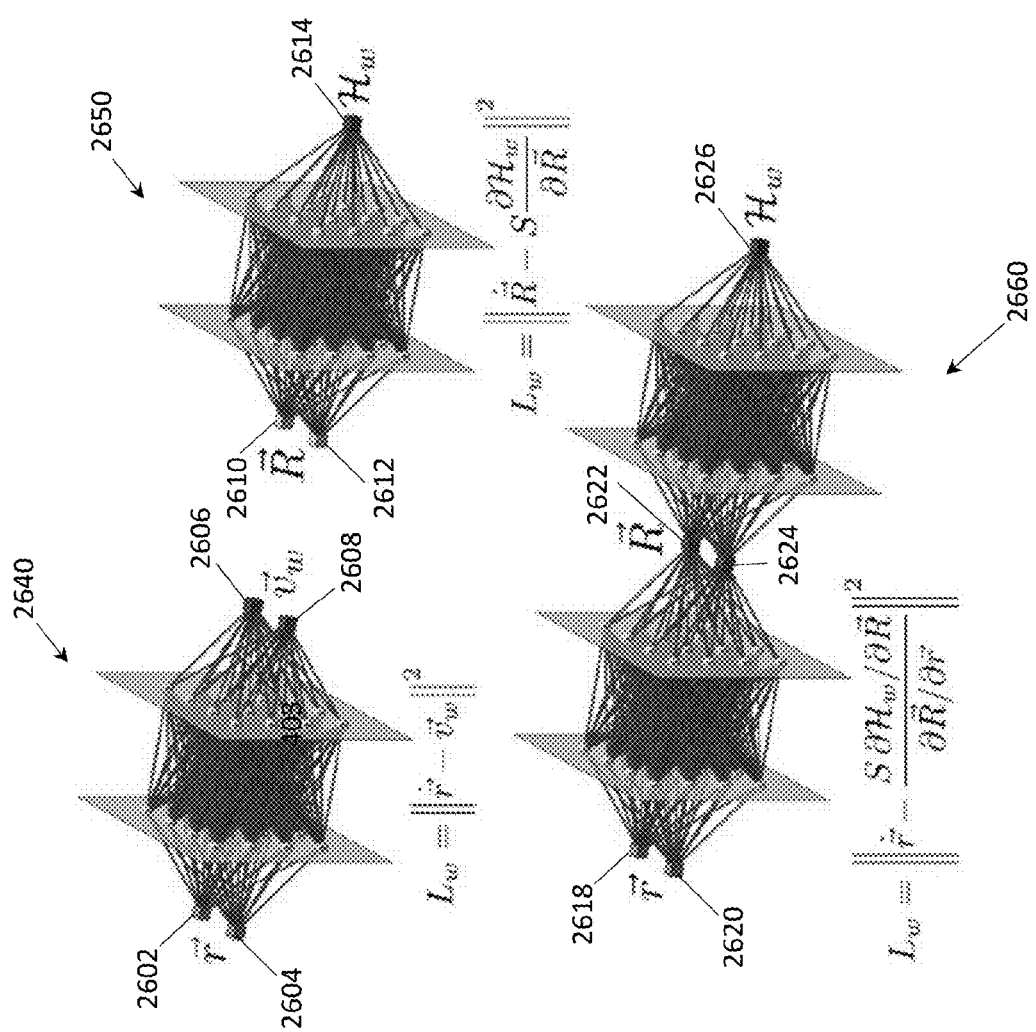
FIG. 26 illustrates exemplary schematics of a neural network (NN), a Hamiltonian neural network (HNN), and a generalized HNN (gHNN) according to an embodiment of the subject matter described herein.

To apply a neural network to a dynamical system $$v=v[r;\omega]=v_\omega[r],$$

a NN 2640 intakes positions and velocities $r=\{q, \dot{q}\}$ (e.g., inputs 2602-2604) and output velocities and accelerations $\dot{r}=\{\dot{q}, \ddot{q}\}$ (e.g., output 2606-2608) as in FIG. 26. With the mean-square-error loss function $$L_\omega=\|\dot{r}-v_\omega[r]\|^2$$

and training pairs $\{r, \dot{r}\}\rightarrow\{q, \dot{q}, \ddot{q}\}$, optimise to find the best $$\hat{w} = \underset{w}{\mathrm{argmin}}\, L_w,$$

and use the trained neural network $$\dot{r}=v_{\hat{\omega}}[r]$$

to evolve the system forward or backward in time.

Hamiltonian Neural Network (HNN)

To create a Hamiltonian neural network 2650

$$\mathcal{H}=\mathcal{H}_{[R,\hat{\omega}]}=\mathcal{H}_\omega[R],$$

the AIH engine is configured to intake phase space or canonical coordinates (e.g., inputs 2610-2610)

$$R = \{Q, P\} = \left\{Q, \frac{\partial \mathcal{L}}{\partial \dot{Q}}\right\},$$

where $\mathcal{L}$ is the Lagrangian, and output a scalar Hamiltonian $\mathcal{H}_w$ 2650 as in FIG. 26. The Hamiltonian obeys Hamilton's equations (i.e., 'Hamiltonian's equations')

$$\frac{d}{dt}\begin{bmatrix}Q\\P\end{bmatrix}=\begin{bmatrix}+\partial\mathcal{H}/\partial P\\-\partial\mathcal{H}/\partial Q\end{bmatrix}=\begin{bmatrix}0 & 1\\-1 & 0\end{bmatrix}\begin{bmatrix}\partial\mathcal{H}/\partial Q\\\partial\mathcal{H}/\partial P\end{bmatrix}$$

$$V = \dot{R} = S\frac{\partial\mathcal{H}}{\partial R} = S\nabla_R\mathcal{H},$$

where S is the symplectic block matrix $$S=\begin{bmatrix}0 & 1\\-1 & 0\end{bmatrix}.$$

The AIH engine may calculate the gradient a $\partial\mathcal{H}/\partial R$ using automatic differentiation of the neural network output (e.g., output 2614) with respect to its input, and define the mean-square-error loss function $$L_w = \|\dot{R} - V_w[R]\|^2 = \left\|\dot{R} - S\frac{\partial\mathcal{H}_w}{\partial R}\right\|^2.$$

The AIH engine optimizes over training pairs $\{R, \dot{R}\}\rightarrow\{Q, P, \dot{Q}, \dot{P}\}$ to find the best $\hat{w}$, and use the trained neural network $$\dot{R} = V_{\hat{w}}[R] = S\frac{\partial\mathcal{H}_{\hat{w}}}{\partial R} = S\nabla_R\mathcal{H}_{\hat{w}}$$

Generalised Hamiltonian Neural Network (gHNN)

In some embodiments, the disclosed subject matter may be configured to learn a dynamical system's phase space vector field (or differential equations) from the experimentally observed generalized coordinates of sample orbits. However, for most problems, the generalized coordinates are not canonical coordinates. Therefore, to leverage the power of HNN, the AIH engine can be configured to embody a modified learning architecture where canonical coordinates are effectively learned in an unsupervised manner.

To create a generalized HNN 2660

$$\mathcal{H} = \mathcal{H}_{[R[r],\omega]} = \mathcal{H}_\omega[R[r]],$$

a neural network concatenation intakes generalized positions and velocities r={q, q̇} (e.g., inputs 2618-2620) transforms them to position and conjugate momenta R={Q, P} (e.g., data 2622-2624), or some combinations thereof, and outputs a scalar Hamiltonian $\mathcal{H}_w$ (e.g., output 2626) as shown in FIG. 26. The phase space velocities $$\dot{R} = \frac{\partial R}{\partial r}\frac{dr}{dt} = J\dot{r},$$

where J is a Jacobian matrix of partial derivatives. The AIH engine can be configured to invert to find $$v = \dot{r} = J^{-1}\dot{R} = J^{-1}S\frac{\partial \mathcal{H}}{\partial R}$$

using Hamilton's equations indicated above. The AIH engine may then calculate the derivatives $\partial\mathcal{H}_w/\partial R$ and $\partial R/\partial r$ using automatic differentiation of the neural network outputs with respect to their inputs, and define the mean-square-error loss function $$L_w = \|\dot{r} - v_w[r]\|^2$$
$$= \|\dot{r} - J^{-1}S\nabla\mathcal{H}_w\|^2$$
$$= \left\|\dot{r} - \frac{S\partial\mathcal{H}_w/\partial R}{\partial R/\partial r}\right\|^2.$$

The AIH engine can then optimize over training pairs {r, ṙ}⊖{q, q̇, q̈} to find the best ŵ, and use the trained neural network $$\dot{r} = v_{\hat{w}}[r] = \frac{S\partial\mathcal{H}_{\hat{w}}/\partial R}{\partial R/\partial r}$$

to evolve the system.

In the special case where the generalized coordinates are the canonical positions, q=Q, the Jacobian simplifies to the block matrix $$J = \frac{\partial R}{\partial r} = \begin{bmatrix} \frac{\partial Q}{\partial q} & \frac{\partial Q}{\partial \dot{q}} \\ \frac{\partial P}{\partial q} & \frac{\partial P}{\partial \dot{q}} \end{bmatrix} = \begin{bmatrix} 1 & 0 \\ \frac{\partial P}{\partial q} & \frac{\partial P}{\partial \dot{q}} \end{bmatrix}.$$

If observed or generalized coordinates $\mathcal{O}$={u, v} relate to an unknown or implicit Hamiltonian with canonical coordinates Q and P, then the neural network architecture $$\mathcal{H} = \mathcal{H}_{[R[\mathcal{O}],\omega]} = \mathcal{H}_\omega[R[\mathcal{O}]]$$

intakes the observables u and v, transforms them to the unknown position and conjugate momenta Q and P, and outputs a scalar Hamiltonian $\mathcal{H}_w$. In this case, the disclosed gHNN of the AHNN assumes a loss function $$L_w = \|\dot{\mathcal{O}} - \dot{\mathcal{O}}_w\|^2 = \left\|\dot{\mathcal{O}} - \frac{S\partial\mathcal{H}_w/\partial R}{\partial R/\partial \mathcal{O}}\right\|^2.$$

and optimizes over training pairs {$\mathcal{O}$, $\dot{\mathcal{O}}_w$}={u, v, u̇, v̇} to find the best ŵ.

Predator-Prey Example Results

The Lotka-Volterra predator-prey model is the "hydrogen atom" of mathematical ecology. It is also an interesting and highly nontrivial example of a system that has an underlying Hamiltonian structure, though it has no mechanical analogue, and its standard variables do not allow a Hamiltonian or Lagrangian description of its time evolution. Further, since this system arises in the context of population dynamics, there is no intuitive equivalent of kinetic or potential energy. So the construction of the Hamiltonian function via the usual route of kinetic and potential energy components is not possible here, and consequently it is highly nontrivial to guess the form of the Hamiltonian for this system.

Specifically, the coupled nonlinear differential equations governing the population of prey $n_1$ and predator $n_2$ are $$\dot{n}_1 = +\alpha n_1 - \beta n_1 n_2,$$

$$\dot{n}_2 = -\gamma n_2 + \delta n_1 n_2,$$

Notice that neither variable (nor their combinations) can be naturally or readily identified as being coordinate-like or momentum-like. Also, interestingly the combination $$\tilde{\mathcal{H}} = \alpha \log n_2 - \beta n_2 + \gamma \log n_1 - \delta n_1$$

is a constant of motion but not a Hamiltonian that generates dynamics associated with the coupled nonlinear differential equations presented above. However, the exponential transformation $$n_1 = e^Q,$$

$$n_2 = e^P$$

implies the coupled system $$\dot{Q} = +\alpha - \beta e^P,$$

$$\dot{P} = -\gamma + \delta e^Q,$$

where the combination $$\mathcal{H} = \alpha P - \beta e^P + \gamma Q - \delta e^Q$$

is both a constant of the motion and a Hamiltonian that generates coupled system dynamics via $$\dot{Q} = +\frac{\partial \mathcal{H}}{\partial P},$$

$$\dot{P} = -\frac{\partial \mathcal{H}}{\partial Q}.$$

Thus, a nonlinear change of variables converts the system into a Hamiltonian form, and helps reveal the underlying Poisson structure that is not evident at all in standard variables.

Now the learning task is to predict the conservative dynamics by training on the "ordinary" coordinates {$n_1$, $n_2$} and their derivatives {$\dot{n}_1$, $\dot{n}_2$} which are the natural observables in the system, without knowing the "canonical" coordinates {Q, P}.

The training data may include 100 trajectories corresponding to different initial conditions, each with a different pseudo-energy, which demonstrates the famous cycling of predator and prey populations, where the state $\{n_1, n_2\}=\{\gamma/\delta, \alpha/\beta\}$ is an elliptical fixed point, and the state $\{n_1, n_2\}=\{0, 0\}$ is a hyperbolic fixed point. The sampling time $\Delta t=0.1$ is intentionally large to better approximate real-world data. Implementation details are indicated above. In some embodiments, parameters are $\alpha=\beta=\delta=\gamma=1$.

Figure 27:
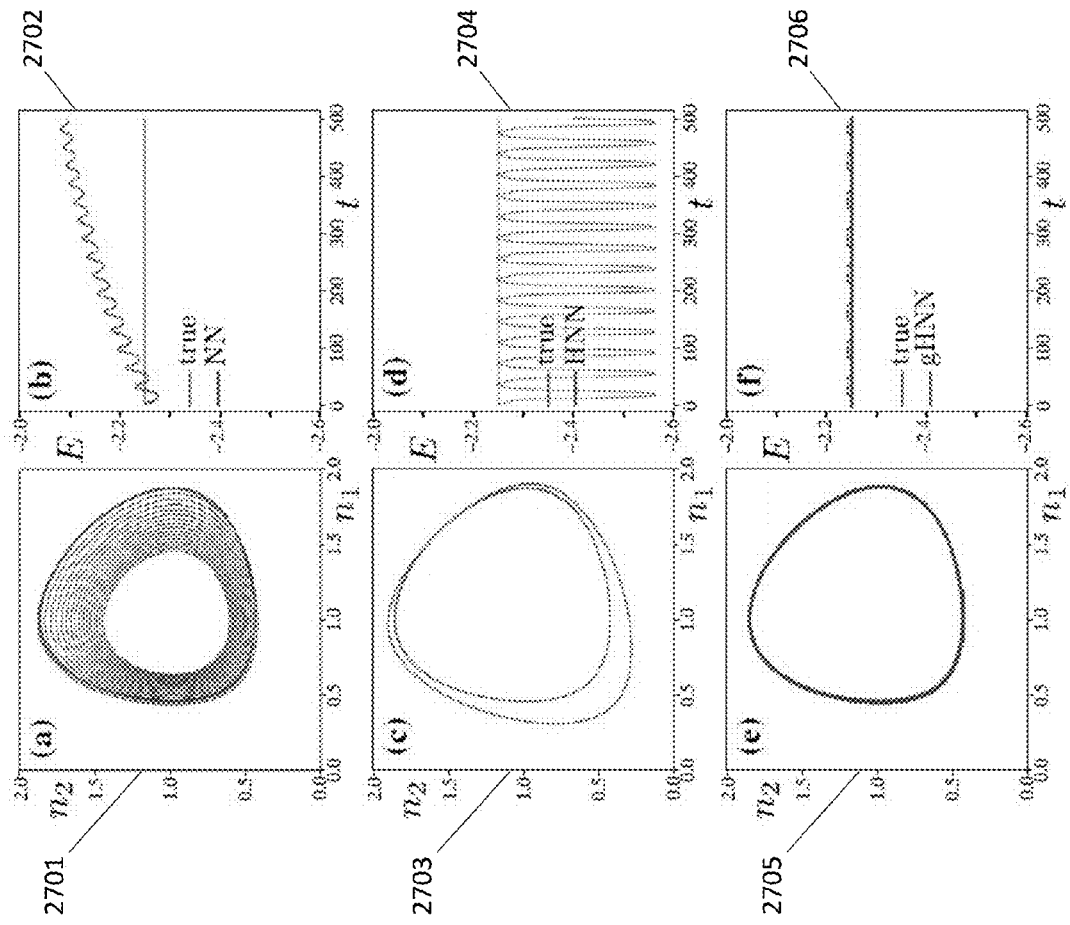
FIG. 27 illustrates plots pertaining to exemplary predator-prey trajectories forecasted by neural networks according to an embodiment of the subject matter described herein.

Each neural network can be trained identically on the "ordinary" coordinates $\{n_1, n_2\}$ and their derivatives using the loss functions indicated above. Forecasts are made from unseen initial conditions, as shown in FIG. 27. In some embodiments, the NN (see plots 2701-2702) learns the trajectory for short times, but with no pseudo-energy constraint, it gradually diverges from the true dynamics. The HNN (see plots 2703-2704) learns some other trajectory and does not preserve the pseudo-energy. With its concatenated neural networks, the gHNN (see plots 2705-2706) learns both the trajectory and the pseudo-energy, because its first neural network approximates the relationship between the "ordinary" and canonical coordinates. Notably, FIG. 27 depicts predator-prey forecasted trajectories $n_2$ versus $n_1$ and corresponding pseudo-energies E versus time t for NN (see plots 2701-2702), HNN (see plots 2703-2704), and gHNN (see plots 2705-2706) trained on generalized coordinates $\{n_1, n_2\}$ and their derivatives. The NN quickly departs the pseudoenergy surface, while the HNN is confused by the noncanonical coordinates, but the gHNN conserves the pseudo-energy and forecasts well. In FIG. 27, parameters are $\alpha=\beta=\gamma=\delta=1$.

Elastic Pendulum Example

The elastic pendulum is a simple mechanical system that exhibits a range of fascinating behavior. In fact many real-world pendulums can be better modeled by an elastic, rather than an inextensible, suspension. The inverted version of such elastic pendulums also have relevance in robotics and mechatronics. Further, in formal terms, it serves as a paradigm of a simple nonlinear system whose canonical momenta are nontrivial combinations of its coordinates. If the pendulum has length $\ell=r$ and is at an angle $\theta$ from downwards, then the pendulum mass m is at position $$r=\{x,y\}=\ell\{\sin\theta,-\cos\theta\}$$

moving with velocity $$v=\dot{r}=\dot{\ell}\{\sin\theta,-\cos\theta\}+\ell\{\cos\theta,\sin\theta\}\dot{\theta}.$$

The Lagrangian $$\mathcal{L} = T - \mathcal{V}$$
$$= \frac{1}{2}mv^2 + mg\ell\cos\theta - \frac{1}{2}k(\ell-\ell_0)^2,$$

where m is the mass, k is the stiffness, $\ell_0$ is the equilibrium length, and g is the gravitational field. The conjugate momenta $$p_\ell = \frac{\partial\mathcal{L}}{\partial\dot{\ell}} = m\dot{\ell},$$

$$p_\theta = \frac{\partial\mathcal{L}}{\partial\dot{\theta}} = m\ell^2\dot{\theta},$$

where $p_\theta$ is not simply mass times velocity.

The learning task is to predict the conservative dynamics by training on the generalized coordinates $\{\ell, \theta\}$ and their derivatives $\{\dot{\ell}, \dot{\theta}, \ddot{\ell}, \ddot{\theta}\}$ without knowing the canonical coordinates $\{\ell, \theta, p_\ell, p_\theta\}$. Parameters are $m=g=\ell=1$ and $k=4$. The training data consists of 100 trajectories corresponding to different initial conditions, each with a different energy, again coarsely sampled.

Figure 28:
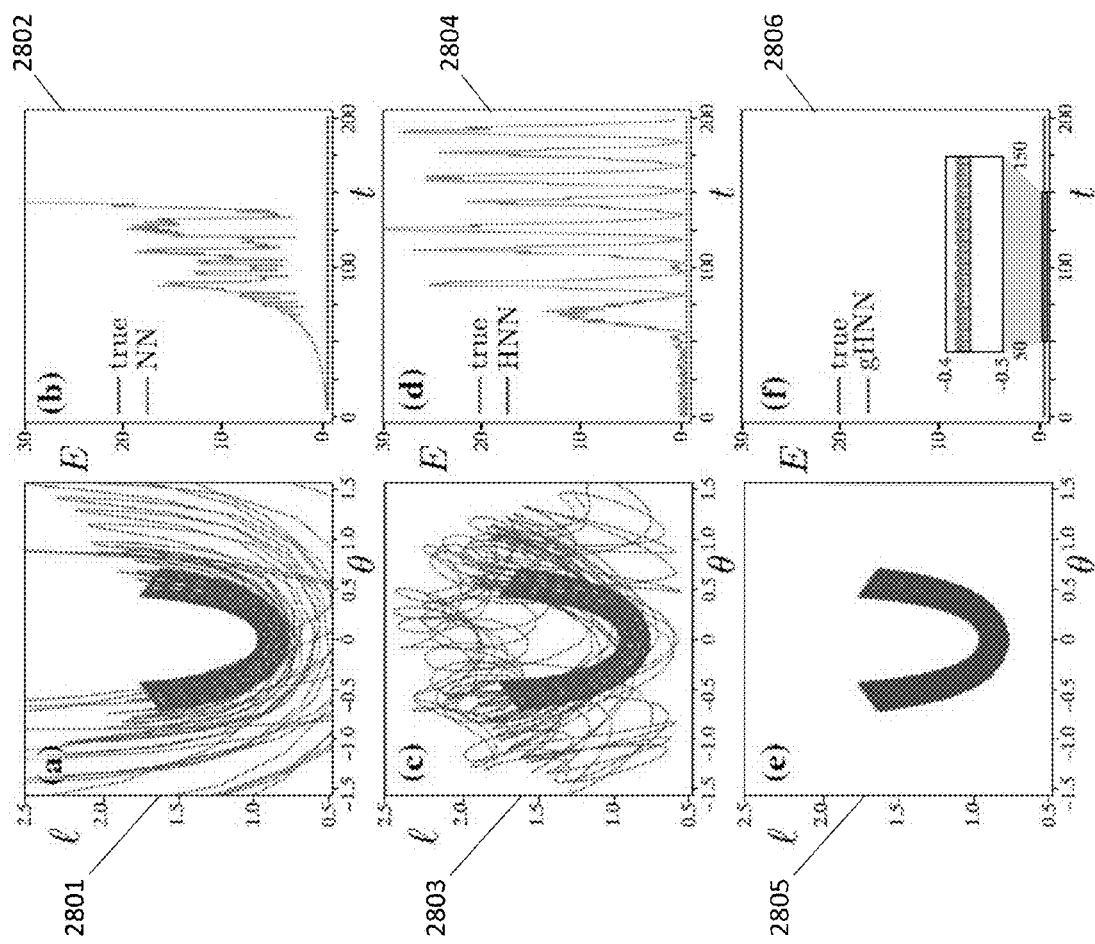
FIG. 28 illustrates plots pertaining to exemplary elastic pendulum trajectories forecasted by neural networks according to an embodiment of the subject matter described herein.

Each neural network trains identically on generalized coordinates $\{\ell, \theta\}$ and their derivatives using the loss functions presented above. Forecasts are made from unseen initial conditions, as in FIG. 28. The NN (see plots 2801-2802) learns the trajectory for short times, but with no energy constraint, the NN dramatically diverges from the true dynamics. The HNN (see plots 2803-2804) seems confused by the generalized coordinates when it expects canonical coordinates, and the HNN neither conserves energy nor learns the trajectory, even qualitatively. With its concatenated neural networks, the gHNN (see plots 2805-2806) learns the trajectory from the generalized coordinates even for long times, because its first neural network approximates the relationship between the generalized and canonical coordinates. Notably, FIG. 28 illustrates elastic pendulum forecasted trajectories $\ell$ versus $\theta$ and corresponding energies E versus time t for NN (see plots 2801-2802), HNN (see plots 2803-2804), and gHNN (see plots 2805-2806) trained on generalized coordinates $\{\ell, \theta\}$ and their derivatives. The NN diverges from the energy surface, while HNN is confused by the noncanonical coordinates, but gHNN respects the energy and forecasts well, with relatively negligible error. In FIG. 28, parameters are $m=g=\ell_0=1$ and $k=4$.

Double Pendulum Example

As a more challenging example, consider librations of a double pendulum. This is a classic chaos demonstrator, both of whose canonical momenta are nontrivial combinations of its coordinates. If the pendulum lengths $\ell_1$ and $\ell_2$ are at angles $\theta_1$ and $\theta_2$ from downwards, then the masses $m_1$ and $m_2$ are at positions $$r_1=\{x_1,y_1\}=\ell_1\{\sin\theta_1,-\cos\theta_1\},$$

$$r_2=\{x_2,y_2\}=\ell_2\{\sin\theta_2,-\cos\theta_2\}+r_1$$

moving with linear velocities $$v_1=\dot{r}_1=\ell_1\{\cos\theta_1,\sin\theta_1\}\dot{\theta}_1,$$

$$v_2=\dot{r}_2=\ell_2\{\cos\theta_2,\sin\theta_2\}\dot{\theta}_2+v_1.$$

The Lagrangian $$\mathcal{L} = T - \mathcal{V}$$
$$= \frac{1}{2}m_1v_1^2 + \frac{1}{2}m_2v_2^2 + m_1gy_1 + m_2gy_2$$
$$= \frac{1}{2}(m_1+m_2)\ell_1^2\dot{\theta}_1^2 + \frac{1}{2}m_2\ell_2^2\dot{\theta}_2^2 + m_2\ell_1\ell_2\dot{\theta}_1\dot{\theta}_2\cos[\theta_1-\theta_2] +$$
$$(m_1+m_2)g\ell_1\cos\theta_1 + m_2g\ell_2\cos\theta_2,$$

where g is the gravitational field. The conjugate momenta $$p_1 = \frac{\partial\mathcal{L}}{\partial\dot{\theta}_1} = (m_1+m_2)\ell_1^2\dot{\theta}_1 + m_2\ell_1\ell_2\dot{\theta}_2\cos[\theta_1-\theta_2],$$

$$p_2 = \frac{\partial\mathcal{L}}{\partial\dot{\theta}_2} = m_2\ell_2^2\dot{\theta}_2 + m_2\ell_1\ell_2\dot{\theta}_1\cos[\theta_1-\theta_2],$$

where neither $p_1$ nor $p_2$ is simply mass times velocity.

The learning task is to predict the conservative dynamics by training on the generalized coordinates $\{\theta_1$ and $\theta_2\}$ and their derivatives $\dot{\theta}_1, \dot{\theta}_2, \ddot{\theta}_1, \ddot{\theta}_2\}$ without knowing the canonical coordinates $\{\theta_1, \theta_2, p_1, p_2\}$. Parameters are $m_1 = m_2 = \ell_1 = \ell_2 = g = 1$. The training data consists of 100 trajectories corresponding to different initial conditions.

Figure 29:
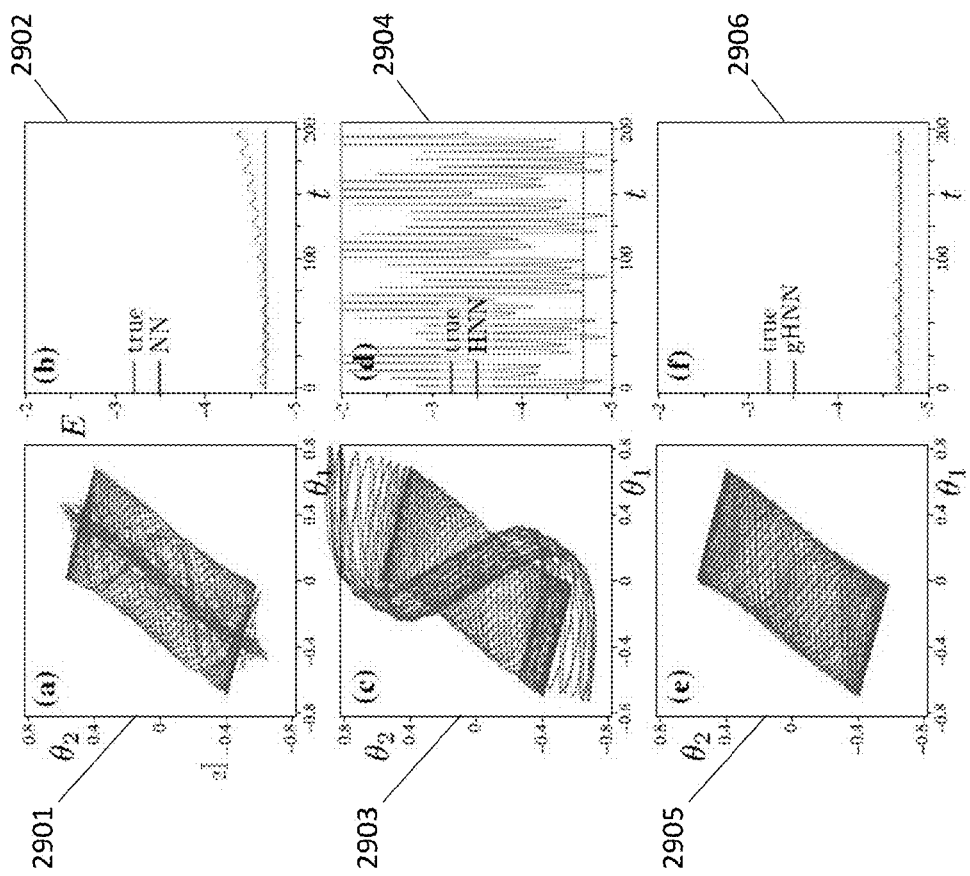
FIG. 29 illustrates plots pertaining to exemplary double pendulum trajectories forecasted by neural networks according to an embodiment of the subject matter described herein.

Each neural network trains identically on generalized coordinates $\{\theta_1, \theta_2\}$ and their derivatives using the loss functions presented above. Forecasts are made from unseen initial conditions, as in FIG. 29. The NN (see plots 2901-2902) learns the trajectory for short times, but with no energy constraint, it gradually diverges from the true dynamics. The HNN (see plots 2903-2904) is confused by the noncanonical coordinates, and fails dramatically. Namely, the HNN tries to learn some Hamiltonian flow, but not the correct one. If the HNN tries to force a Hamiltonian structure where none exists (i.e., tries to find area-preserving flows in the space of generalized coordinates), the HNN can fail even more than the conventional NN. The gHNN (see plots 2905-2906) learns the trajectory from the generalized coordinates even for long times, because its first neural network approximates the relationship between the generalized and canonical coordinates. The gHNN performs well even when the training data is contaminated by modest amounts of additive noise (e.g., generated by pseudo-random numbers). Notably, FIG. 29 depicts double pendulum forecasted trajectories $\theta_1$ versus $\theta_2$ and corresponding energies E versus time t for the NN, the HNN, and the gHNN trained on generalized coordinates $\{\theta_1, \theta_2\}$ and their derivatives. The NN wanders from the energy surface, while the HNN is confused by the noncanonical coordinates. However, the gHNN respects the energy and forecasts well. In FIG. 29, the parameters are $m_1 = m_2 = \ell_1 = \ell_2 = g = 1$.

Pendulum Clock Example

As a final real-world example, consider a wooden pendulum clock. The falling weight drives the pendulum and a deadbeat escapement regulates its libration, overcoming dissipation so the motion is approximately (but not identically) of constant amplitude and frequency. A hand-held smartphone can be used to record 100 seconds of motion at 30 frames-per-second. Video tracking of the ends of the pendulum records the pendulum librations. Trigonometry extracts the angles from the coordinate differences, and finite differencing with a Savgol filter estimates the angular velocities and accelerations. It is determined that the NN fails to learn the motion and its forecast collapses, while a similarly small gHNN can quickly learn a good approximation to the motion.

In some embodiments, the AHNN can be further configured to utilize compactification for purposes of handling unbounded coordinates. Namely, physics-informed machine learning has recently been shown to efficiently learn complex trajectories of nonlinear dynamical systems, even when order and chaos coexist. However, care must be taken when one or more variables are unbounded, such as in rotations. Here, the AHNN uses the framework of HNNs to learn the complex dynamics of nonlinear single and double pendulums, which can both librate and rotate, by mapping the unbounded phase space onto a compact cylinder. Moreover, the AHNN can successfully forecast the motion of these challenging systems, thus being capable of both bounded and unbounded motion. It is also evident that the HNN can yield an energy surface that closely matches the surface generated by the true Hamiltonian function. Further, the relative energy error for HNN has been observed to decrease as a power law with a number of training pairs. Accordingly, HNNs are clearly outperforming conventional neural networks quantitatively.

As indicated above, artificial neural networks (ANN) are powerful tools being developed and deployed in science and industry for a wide range of uses (e.g., especially for classification and regression problems) in applications ranging from pattern recognition to game playing. Although ANNs incorporate nonlinearity in their activation functions, ANNs falter when confronting nonlinear dynamics, which can typically yield qualitatively different behavior, such as vibrations and rotations, or order and chaos. Another striking drawback of conventional neural networks extrapolating time series in Hamiltonian systems is that they may not conserve energy, and the predicted orbits often wander off the energy surface or shoot away to infinity In this context, the AHNN can be configured to leverage the symplectic structure of Hamiltonian phase space. The aforementioned novel physics-inspired framework of HNN internalizes the gradient of an energy-like function in a network's weights and biases. So HNNs embed Hamiltonian dynamics in its operation and ensure that the neural network respects Hamiltonian time-translational symmetry. Importantly, the HNN algorithm incorporates broad principles of energy conserving and volume preserving flows arising from an underlying Hamiltonian function, without invoking any details of its explicit form. It has been demonstrated that HNN can recognize the presence of order and chaos as well as challenging regimes where both these very distinct dynamics coexist. The success of HNN to discern chaos has been explicitly quantified by metrics like Lyapunov spectra and smaller alignment indices, in benchmark dynamical systems such as the paradigmatic Hénon-Heiles potential, and in chaotic billiards. Notably, the physics-informed HNN algorithm significantly enhances the scope of conventional neural networks by successfully forecasting the dynamics of conservative systems, spanning regular ordered behavior to complex chaotic dynamics Further, the improvement in learning and forecasting of dynamical systems was quantified by training conventional and Hamiltonian neural networks on increasingly difficult dynamical systems, and computing their forecasting errors as the number of training data and number of system dimensions varied. The disclosed subject matter utilizes the improved scaling with data and dimensions achieved through incorporation of physics into neural network design. Since nonlinear dynamics is ubiquitous, this neural network "superpower" is widely and immediately applicable.

In some embodiments, the disclosed subject matter utilizes the HNN to model the nonlinear dynamics of pendulums and double pendulums. This is a challenging test-bed as the pendulum can have two very distinct motions. A pendulum can librate, i.e., move back-and-forth, with the motion having turning points. A pendulum may also rotate end-over-end, a case where the angles are unbounded quantities as there are no turning-points, and this can frustrate standard forecasting techniques. For the single pendulum, these two qualitatively different motions are separated by a special curve in phase space, the separatrix, which serves as a boundary between libration (also known as vibration) and rotation. The AIH engine addresses this via mapping the pendulum motion onto a cylindrical phase space and use the coordinates on the cylinder to learn and forecast the motion on both sides of the phase space separatrix.

In some embodiments, a trained neural network is a concatenation of layers of nodes called "neurons" that instantiates a nonlinear function represented as:

$o=N[i,\hat{W},\hat{b}]=N_{\hat{W}\hat{b}}[i]$, where $\hat{W}$ and $\hat{b}$ are the optimal parameters (called weights W and biases b) to convert a given input i to a desired output o. When forecasting a dynamical system, a HNN intakes positions and momenta {q, p} and outputs the Hamiltonian $\mathcal{H}=N_{\hat{W}\hat{b}}[\{q,p\}]$, as shown in FIG. 2 (see output 224), while a conventional NN may intake (for example) positions and velocities (see inputs 210-212 in FIG. 2) and output velocities and accelerations (see outputs 214-216 in FIG. 2)

$\partial_i\{q,\dot{q}\}=N_{\hat{W}\hat{b}}[\{q,\dot{q}\}]$, where overdots indicate time differentiation.

In some embodiments, the HNN algorithm is configured to output the scalar Hamiltonian function $\mathcal{H}$, take its gradient to find its position and momentum rates of change, and minimizes the loss presented below:

$\mathcal{L}_{HNN}=(\dot{q}_t-\partial \mathcal{H}/\partial p)^2+(\dot{p}_t+\partial \mathcal{H}/\partial q)^2$ This loss function enforces the basic structure of Hamilton's equations of motion, for any Hamiltonian function.

Accordingly, the fundamental distinction between the NN and the HNN includes the following: the NN learns the orbits (and/or dynamic behaviors), while the HNN learns the Hamiltonian. Geometrically, the NN learns the generalized velocities, the dual mappings $\{q, \dot{q}\}\to\dot{q}$ and $\{q, \dot{q}\}\to\ddot{q}$, while the HNN learns the Hamiltonian generator function, the single mapping $\{q, p\}\to\mathcal{H}$, whose (symplectic) gradient gives the generalized velocities $\{\dot{q}, \dot{p}\}$. With the same resources, it has been convincingly demonstrated that the HNN outperforms the NN, and the advantage grows as the phase space dimension increases, where q and p are multi-component vectors.

In some embodiments, the Hamiltonian of a pendulum with unit length and unit mass, (angular) position q=0 and (angular) momentum p is $$\mathcal{H}=\frac{p^2}{2}-\cos q.$$

where $p=L=I\omega=I\dot\theta$ and where I denotes the moment of inertia. For a simple pendulum, I is given by the product of the mass and square of the length. So I=1 in this case, as the unit length and unit mass are known. For example, Hamilton's equations of motion $$\dot{q}=+\frac{\partial \mathcal{H}}{\partial p}=+p,$$

$$\dot{p}=-\frac{\partial \mathcal{H}}{\partial q}=-\sin q$$

imply Newton's equation of motion $\ddot{q}=-\sin q$.

For the nonlinear pendulum, the HNN maps its input to the surface $$N_{\hat{W}\hat{b}}[\{q,p\}]=H=\frac{p^2}{2}-\cos q,$$

but the conventional NN maps its input to a plane and an intersecting sinusoid $N_{\hat{W}\hat{b}}[\{q,\dot{q}\}]=\partial_t\{q,\dot{q}\}=\{\dot{q},-\sin q\}$.

Unlike the simpler harmonic oscillator, the nonlinear pendulum exhibits two qualitatively different kinds of motion: back-and-forth libration for small energies and over-the-top rotation for large energies, which challenge conventional neural networks. For rotations, (angular) position q increases without bounds and cannot be scaled to a finite range. Using the representation of the (angular) position modulo $2\pi$ introduces discontinuities that violate the neural network universal approximation theorems.

Figure 30:
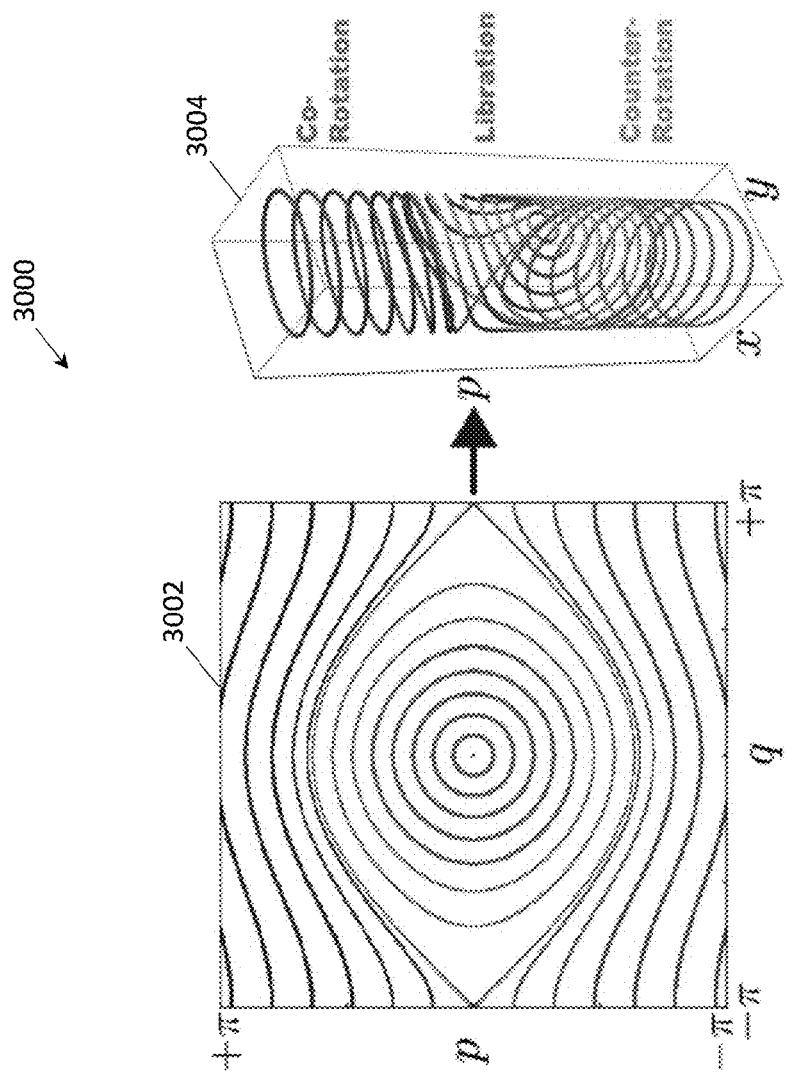
FIG. 30 depicts an illustration of a single pendulum phase space compactified onto a cylinder according to an embodiment of the subject matter described herein.

In some embodiments, the AHNN tackles this problematic issue by wrapping the phase space onto a cylinder, as depicted in FIG. 30. Notably, FIG. 30 depicts a single pendulum phase space plot 3002 that can be compactified onto a cylinder representation 3004, where $q=\theta$ and $p=\omega$. For example, the wrapping of the phase space can be performed with:

$$x=\cos q,$$

$$y=\sin q \text{ and}$$

$$\dot{x}=-\sin q\,\dot{q}=-y\frac{\partial H}{\partial p},$$

$$\dot{y}=+\cos q\,\dot{q}=+x\frac{\partial H}{\partial p}.$$

Inversely $$q=\arctan\frac{y}{x}, \text{ and so}$$

$$\frac{\partial q}{\partial x}=\frac{1}{1+y^2/x^2}\left(-\frac{y}{x^2}\right)=-y,$$

$$\frac{\partial q}{\partial y}=\frac{1}{1+y^2/x^2}\left(+\frac{1}{x}\right)=+x.$$

Thus the chain rule $$\frac{\partial H}{\partial x}=\frac{\partial H}{\partial q}\frac{\partial q}{\partial x}=-\frac{\partial H}{\partial q}y,$$

$$\frac{\partial H}{\partial y}=\frac{\partial H}{\partial q}\frac{\partial q}{\partial y}=+\frac{\partial H}{\partial q}x, \text{ implies}$$

$$\dot{p}=-\frac{\partial H}{\partial q}=+\frac{1}{y}\frac{\partial H}{\partial x}=-\frac{1}{x}\frac{\partial H}{\partial y}.$$

Hence input $\{q, p\}\to\{x, y, p\}$ and output $$\dot{x}=-y\frac{\partial H}{\partial p},$$

$$\dot{y}=+x\frac{\partial H}{\partial p},$$

$$\dot{p}=\begin{cases}+\partial H/\partial x/y, & |x|\le|y|\\ -\partial H/\partial y/x, & |x|>|y|\end{cases},$$

where this choice of equation avoids numerical instability when x or y are near zero.

Figure 31:
FIG. 31 illustrates a table of exemplary simple pendulum hyperparameters according to an embodiment of the subject matter described herein.

In some embodiments, the AIH engine implements the neural networks in Python using automatic differentiation. The HNN and the NN can be trained using the same hyperparameters, as summarized in table 3100 in FIG. 31, including two hidden layers each of 32 neurons. The AIH engine can be configured to train for a range of energies $2.00 < E < 2.11$ for times $0 < t < 10$.

Figure 32:
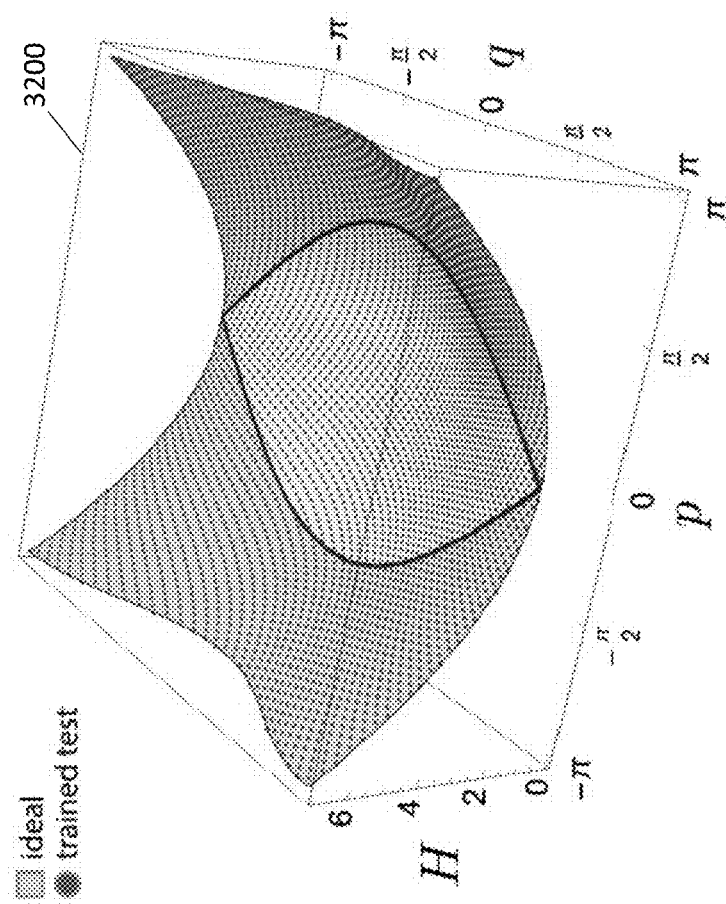
FIG. 32 illustrates a plot of a Hamiltonian function for a single pendulum according to an embodiment of the subject matter described herein.

FIG. 32 shows a plot 3200 representing the true Hamiltonian function for the single pendulum, where the separatrix (denoted in blue) separates libration (denoted in yellow) from rotation (denoted in cyan). The red dots in FIG. 32 denote the Hamiltonian mapping learned through the HNN algorithm, and it is evident that it matches the true surface, demonstrating excellent Hamiltonian function recovery.

Figure 33:
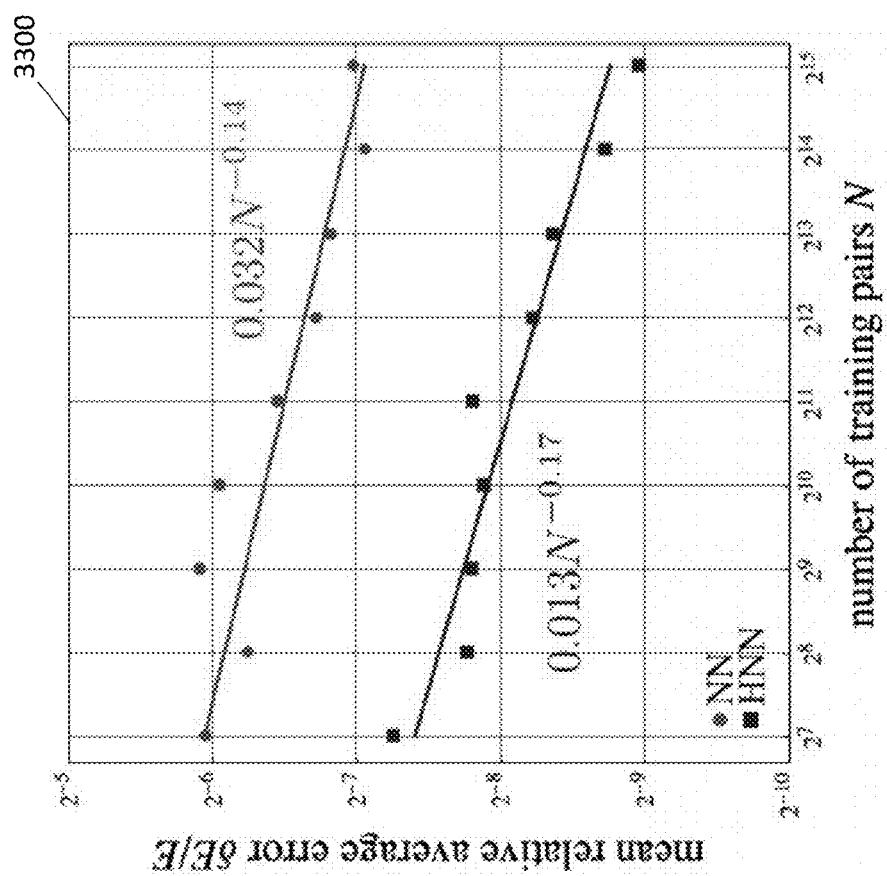
FIG. 33 depicts a plot illustrating the dependence of the mean relative error in energy of a single pendulum according to an embodiment of the subject matter described herein.

Further, FIG. 33 illustrates a plot 3300 that depicts the relative average energy error $\delta E/E$. This quantity is estimated as follows: $\delta E$ is the mean of the instantaneous differences between the energy function forecasted by the neural network and the true energy values E. More specifically, plot 3300 illustrates the dependence of the mean relative error in energy of a single pendulum on number of training pairs N. The best power law fit is indicated by the solid lines. The HNN shown in blue, outperforms the conventional NN shown in red, with the HNN yielding consistently lower errors, as well as a faster fall in errors with increasing number of training sets. Note that the true energy E has a constant value on each true orbit, and is time-invariant. Further, this measure decreases as a power law with the number N of training pairs for the HNN. Thus, the HNN yields consistently lower errors as indicated above. As such, one can thus conclude that the HNN quantitatively outperforms the NN, even in this challenging case of mixed bounded and unbounded motions.

Figure 34:
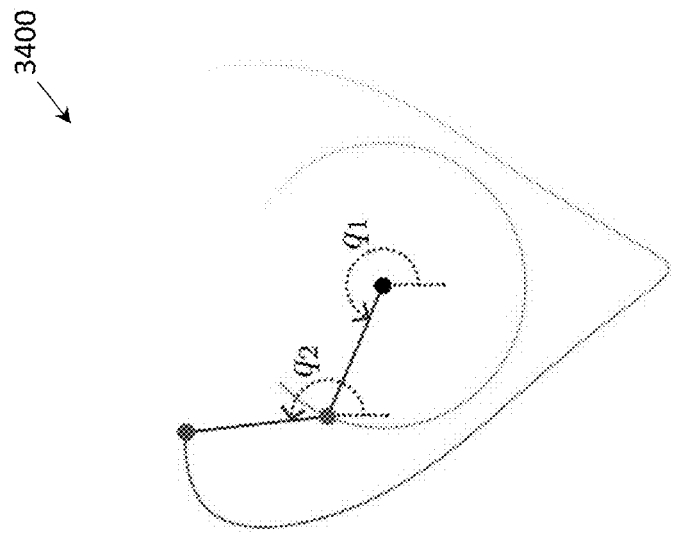
FIG. 34 depicts an exemplary double pendulum exhibiting periodic and chaotic motion according to an embodiment of the subject matter described herein.

In some embodiments, the AHNN can be modeled as a nonlinear double pendulum. For a double pendulum 3400 that is exhibiting periodic and chaotic motion as shown in FIG. 34, with unit arms and masses, angles $q_1$ and $q_2$, angular velocities $p_1$ and $p_2$, the positions $$x_1 = +\sin q_1,$$

$$y_1 = -\cos q_1,$$

and $$x_2 = x_1 + \sin q_2,$$

$$y_2 = y_1 - \cos q_2$$

yield the Lagrangian, derivatives of which generate the momenta $$p_1 = 2\dot{q}_1 + \dot{q}_2 \cos[q_1 - q_2],$$

$$p_2 = \dot{q}_2 + \dot{q}_1 \cos[q_1 - q_2].$$

A Legendre transformation of the Lagrangian generates the Hamiltonian:

$$H = \frac{p_1^2 + 2p_2^2 - 2p_1 p_2 \cos[q_1 - q_2]}{3 - \cos[2(q_1 - q_2)]} - 2\cos q_1 - \cos q_2,$$

and Hamilton's equations of motion yield the following:

$$\dot{q}_1 = 2 \frac{p_1 - p_2 \cos[q_1 - q_2]}{3 - \cos[2(q_1 - q_2)]},$$

-continued $$\dot{q}_2 = 2 \frac{2p_2 - p_1 \cos[q_1 - q_2]}{3 - \cos[2(q_1 - q_2)]},$$

$$\dot{p}_1 = -2\sin q_1 - 4\frac{(p_1 - p_2\cos[q_1 - q_2])(2p_2 - p_1\cos[q_1 - q_2])}{(3 - \cos[2(q_1 - q_2)])^2} \sin[q_1 - q_2],$$

$$\dot{p}_2 = -\sin q_2 + 4\frac{(p_1 - p_2\cos[q_1 - q_2])(2p_2 - p_1\cos[q_1 - q_2])}{(3 - \cos[2(q_1 - q_2)])^2} \sin[q_1 - q_2].$$

Figure 35:
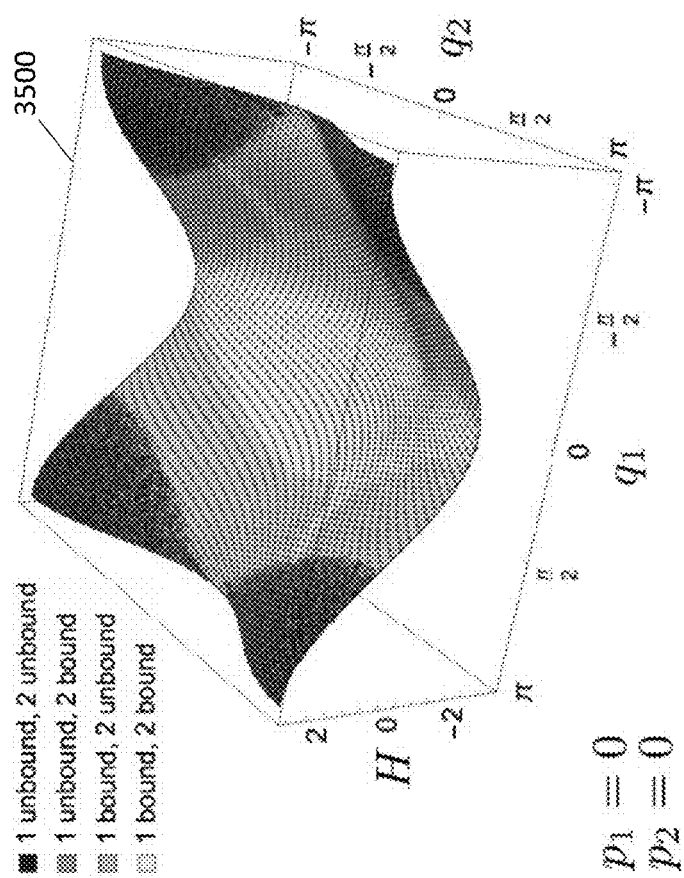
FIG. 35 depicts a plot illustrating the cross-section of the Hamiltonian function for the double pendulum according to an embodiment of the subject matter described herein.

In the two-dimensional phase space of the single pendulum, a one-dimensional curve separates the bound and unbound orbits (e.g., dynamic behaviors). While this is topologically impossible in the four-dimensional phase space of the double pendulum, the dynamics still exhibit the qualitatively different motions of libration and rotation of the individual pendulum masses. The boundaries demarcating distinct dynamical behaviors in the high-dimensional phase space of the double pendulum are very complex (see FIG. 35). In particular, FIG. 35 illustrates a plot 3500 depicting the cross-section of the Hamiltonian function for the double pendulum. Red dots denote the Hamiltonian mapping learned through the HNN algorithm, which effectively matches the true surface. Colors can code the boundedness or unboundedness of the angles $q_1$ and $q_2$ after a long period of time, starting from motionless initial states, with $p_1 = 0$, $p_2 = 0$ and angles $q_1, q_2 \in [-\pi, \pi]$. Specifically, yellow codes the orbits where the final values of $q_1$ and $q_2$ are still bounded in the range $[-\pi, \pi]$, cyan codes the orbits where $q_1 \in [-\pi, \pi]$ but $q_2 \notin [-\pi, \pi]$, green codes the orbits where $q_2 \in [-\pi, \pi]$ but $q_1 \notin [-\pi, \pi]$, and blue codes unbounded orbits where the final values of both $q_1$ and $q_2$ are not in $[-\pi, \pi]$. Notably, this system serves as a stringent test of the presented approach, and it is determined that the HNN algorithm is very successful even in this particularly difficult system.

Figure 36:
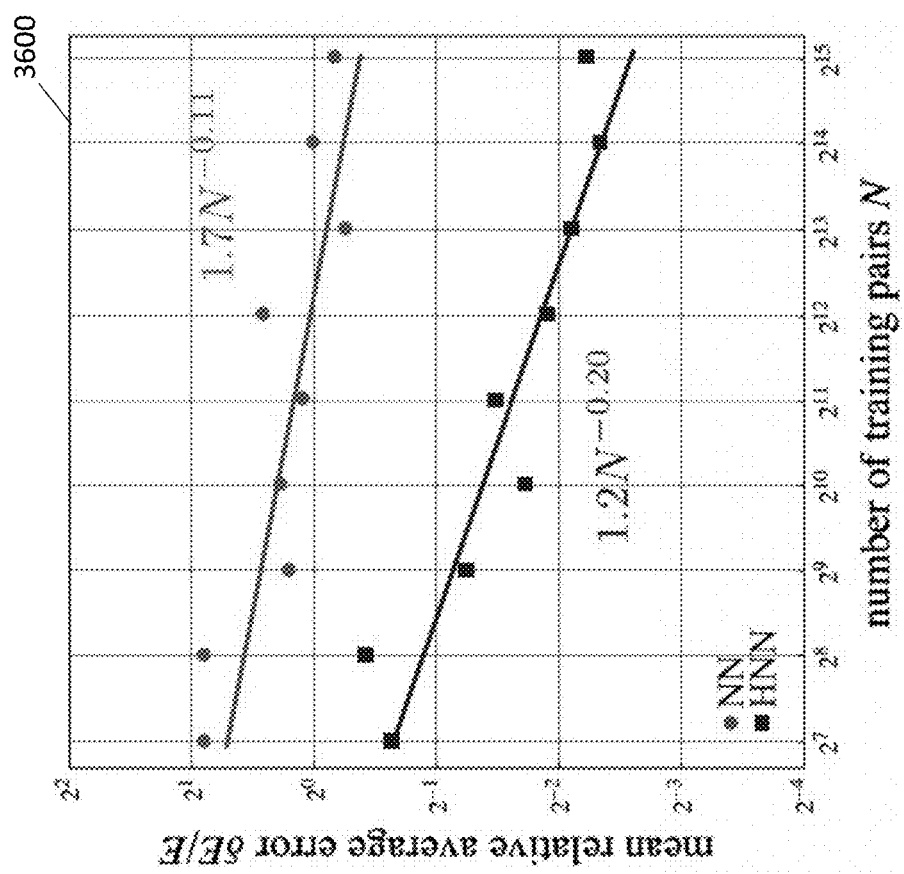
FIG. 36 depicts a plot illustrating the dependence of the mean relative error in energy of a double pendulum according to an embodiment of the subject matter described herein.

As before, the AIH engine can implement the neural networks in Python using automatic differentiation. FIG. 35 shows the true Hamiltonian function for the double pendulum, with the red dots denoting the Hamiltonian mapping learned through the HNN algorithm. It is again evident that there is a very good match between the true and forecasted energy surface cross-section, demonstrating excellent Hamiltonian function recovery. Further FIG. 36 shows a plot 3600 depicting the relative average energy error $\delta E/E$ obtained with HNN decreases as a power law with the number N of training pairs. Notably, FIG. 36 illustrates the dependence of the mean relative error in energy of a double pendulum on number of training pairs. The best power law fit is indicated by the solid lines. The HNN (shown in blue) outperforms conventional NNs shown in red, with HNN yielding consistently lower errors, as well as faster fall in errors with increasing number of training sets. So one can again conclude that HNN quantitatively outperforms NN even for mixed libration and rotation.

Physics-informed machine learning has been shown to efficiently learn complex trajectories of nonlinear dynamical systems. However, one encounters problems when one or more variables are unbounded, such as in rotations. Notably, the AHNN can be configured to use the framework of HNNs to learn the complex dynamics of nonlinear single and double pendulums that can both librate back-and-forth and rotate end-over-end. The unbounded motion may be handled by mapping onto a cylindrical phase space and working with the compact cylinder coordinates. The AHNN demonstrates that this approach is able to successfully learn and forecast the qualitatively distinct behavior on both sides of the phase space separatrix. It is also evident that the HNN can yield an energy surface which is a close match to the surface generated by the true Hamiltonian function. Lastly, it is observed that the relative energy error for HNN decreases as a power law with number of training pairs, with HNN clearly outperforming conventional neural networks quantitatively.

Figure 37:
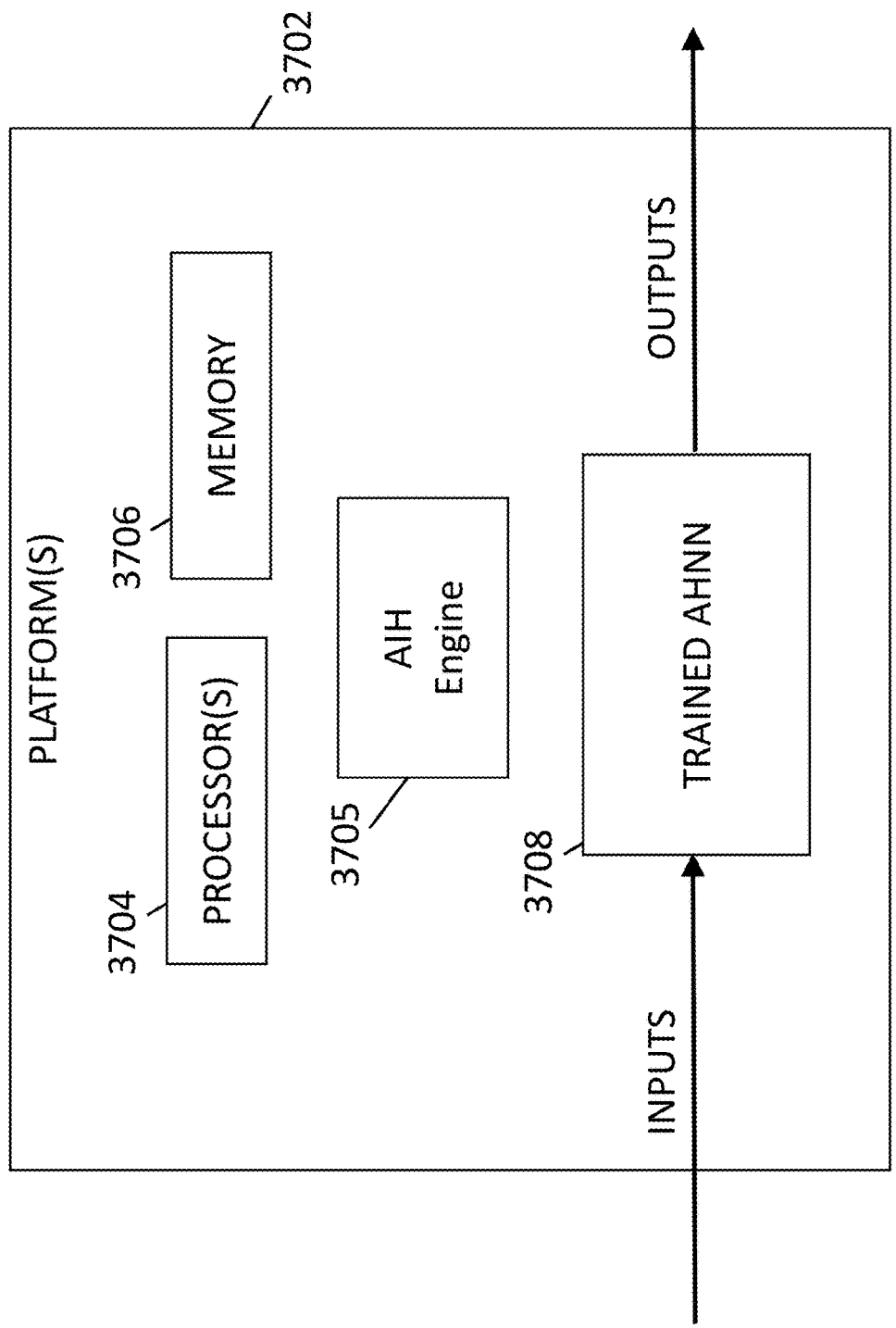
FIG. 37 is a block diagram of an example system for utilizing physics augmented neural networks configured for operating in environments that mix order and chaos according to an embodiment of the subject matter described herein.

FIG. 37 is a block diagram of an example system 3700 for utilizing physics augmented neural networks configured for operating in environments that mix order and chaos. In FIG. 37, system 3700 may include one or more computing platform(s) 3702 having one or more processor(s) 3704, such as a central processing unit (e.g., a single core or multiple processing cores), a microprocessor, a microcontroller, a network processor, an application-specific integrated circuit (ASIC), or the like. Platform 3702 may also include memory 3706. Memory 3706 may comprise random access memory (RAM), flash memory, a magnetic disk storage drive, and the like. In some embodiments, memory 3706 may be configured to store AIH engine 3706 and a trained AHNN 3708 (and/or a gHNN). More specifically, trained AHNN 3708 may reside on memory of computing platform(s) 3702 and be executable by processor(s) 3704. Trained AHNN 3708 may be configured to receive a variety of dynamical data (e.g., positions, velocities, etc.) as input data and may generate an approximations of the time derivatives (e.g., a derivate of the velocity and/or position inputs) as output. In some embodiments, AIH engine 3706 can be configured to provide the input data to AHNN 3708. In some embodiments, AIH engine 3706 is a software algorithm or process that is configured to construct and/or generate gHNNs or AHNNs (e.g., trained AHNN 3708), HNNs, NNs, and the like. Likewise, AIH engine 3706 can be configured to manage and/or execute the training of gHNNs or AHNNs (e.g., trained AHNN 3708), HNNs, and NNs in the manner described above.

It will be appreciated that FIG. 37 is for illustrative purposes and that various entities, their locations, and/or their functions may be changed, altered, added, or removed. For example, some entities and/or functions may be combined into a single entity. In another example, an entity and/or function may be located at or implemented by two or more entities.

Figure 38:
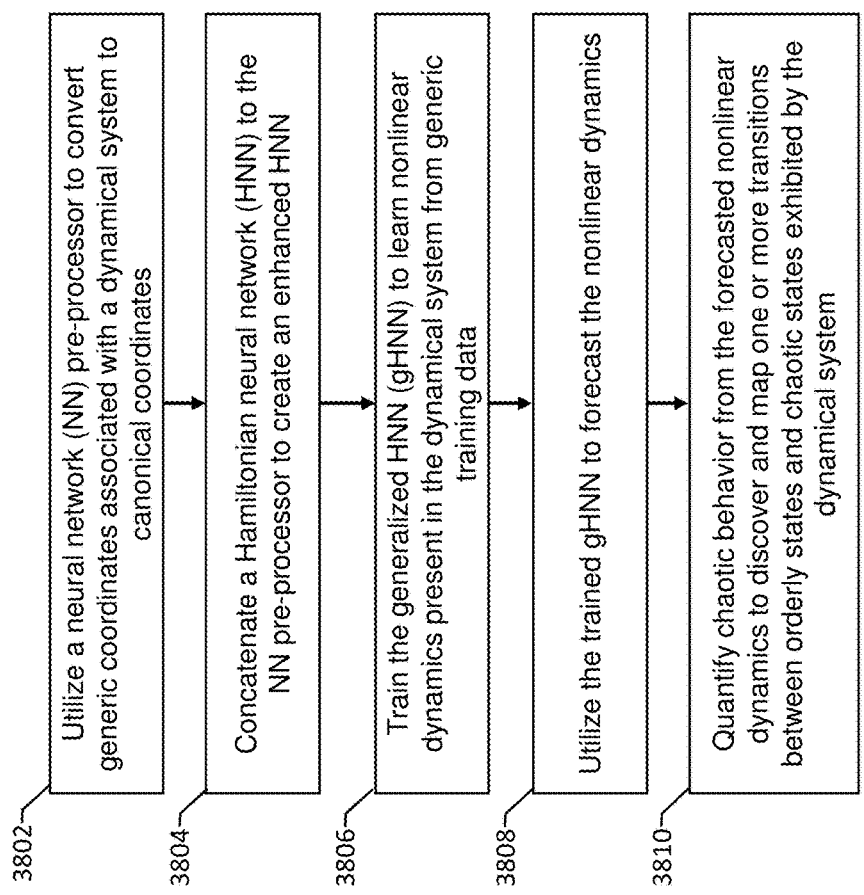
FIG. 38 illustrates a flow chart depicting an exemplary method for utilizing physics augmented neural networks configured for operating in environments that mix order and chaos according to an embodiment of the subject matter described herein.

FIG. 38 is a flow chart illustrating an exemplary method for utilizing physics augmented neural networks configured for operating in environments that mix order and chaos. In some embodiments, method 3800 includes an algorithm and/or software process that is stored in memory and subsequently executed by one or more hardware processors of a computing platform. For example, method 3800 can comprise AIH engine 3705 described above (or a hardware based network element hosting and/or supporting the AIH engine 3705).

In block 3802, a NN pre-processor is utilized to convert generic coordinates associated with a dynamical system to canonical coordinates. In some embodiments, an exemplary NN pre-processor that is configured to obviate the need for special canonical coordinates is described above and shown in FIG. 26.

In block 3804, a Hamiltonian neural network (HNN) is concatenated to the NN pre-processor to create a generalized HNN (and/or AHNN). In some embodiments, an exemplary generalized HNN that is formed by the combining of the NN pre-processor and an HNN. A resulting generalized HNN is described above and depicted in FIG. 26.

In block 3806, the generalized HNN is trained to learn nonlinear dynamics present in the dynamical system from generic training data. Training can be conducted via conventional means and/or by the AIH engine depicted in FIG. 37.

In block 3808, the trained generalized HNN is utilized to forecast the nonlinear dynamics. In some embodiments, the utilization of the trained generalized HNN is managed by an operator utilizing the host computer platform described above and shown in FIG. 37.

In block 3810, chaotic behavior (e.g., chaotic orbits) is quantified from the forecasted nonlinear dynamics to discover and map one or more transitions between orderly states and chaotic states exhibited by the dynamical system. In some embodiments, the trained gHNN can be utilized by a user to quantify chaotic orbits and/or other behavior by receiving new input data.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for utilizing physics augmented neural networks configured for operating in environments that mix order and chaos, the method comprising:

utilizing a neural network (NN) pre-processor to convert noncanonical coordinates associated with a dynamical system to canonical coordinates, wherein the noncanonical coordinates include position and velocity coordinates and the canonical coordinates have values that are nonlinear functions of values of the position and velocity coordinates and include position and conjugate momenta coordinates;

concatenating a Hamiltonian neural network (HNN) to the NN pre-processor to create a generalized HNN, wherein concatenating the HNN to the NN pre-processor includes connecting an output of the NN pre-processor to an input of the HNN and connecting an input of the NN pre-processor to receive the noncanonical coordinates such that when the NN pre-processor receives and converts the noncanonical coordinates, the NN pre-processor outputs the canonical coordinates to the HNN;

training the generalized HNN to learn nonlinear dynamics present in the dynamical system from generic training data, wherein training the generalized HNN includes training the NN pre-processor to output the canonical coordinates given the noncanonical coordinates as input and training the HNN to output values produced by a Hamiltonian function of the canonical coordinates;

utilizing the trained generalized HNN to forecast the nonlinear dynamics, wherein utilizing the trained generalized HNN to forecast the nonlinear dynamics includes inputting values of the noncanonical coordinates to the trained NN pre-processor, generating, by the NN pre-processor, values of the canonical coordinates, and generating, by the HNN, values produced by the Hamiltonian function of the values of the canonical coordinates output from the NN pre-processor; and quantifying chaotic behavior from the forecasted nonlinear dynamics to discover and map one or more transitions between orderly states and chaotic states exhibited by the dynamical system, wherein the dynamical system comprises a physical system and quantifying the chaotic behavior includes using the values output by the HNN to describe motion of the physical system.

2. The method of claim 1 wherein the generalized HNN is utilized to execute applications including a self-driving automobile application, a drone piloting application, a tracking application, an aerospace application, a social network dynamic application, and a control system application.

3. The method of claim 1 wherein the generalized HNN is configured to compact the canonical coordinates if the canonical coordinates are unbounded.

4. The method of claim 1 wherein the generalized HNN is further configured to detect when a macroscopic system is unable to be modeled using Hamiltonian dynamics.

5. The method of claim 1 wherein the generalized HNN is trained using physics-informed machine learning.

6. The method of claim 1 wherein the generalized HNN is a feed-forward neural network that is configured to learn from the generic training data.

7. The method of claim 1 further comprising utilizing a customized loss function to compel a Hamiltonian phase space flow.

8. The method of claim 1 wherein the generalized HNN utilizes a neural network autoencoder to capture dimensionality.

9. The method of claim 1 wherein the dynamic system is a Hénon-Heiles system.

10. The method of claim 1 wherein the chaotic behavior is quantified using a smaller alignment indices metric.

11. A system for utilizing physics augmented neural networks configured for operating in environments that mix order and chaos, the system comprising:
at least one processor;
a memory element;
a neural network pre-processor configured to convert noncanonical coordinates associated with a dynamical system to canonical coordinates, wherein the noncanonical coordinates include position and velocity coordinates and the canonical coordinates have values that are nonlinear functions of values of the position and velocity coordinates and include position and conjugate momenta coordinates; and
a generalized HNN (gHNN) generation engine (GGE) stored in the memory element and when executed by the at least one processor is configured for concatenating a Hamiltonian neural network (HNN) to the NN pre-processor to create a generalized HNN, wherein concatenating the HNN to the NN pre-processor includes connecting an output of the NN pre-processor to an input of the HNN and connecting an input of the NN pre-processor to receive the noncanonical coordinates such that when the NN pre-processor receives and converts the noncanonical coordinates, the NN pre-processor outputs the canonical coordinates to the HNN,
wherein the GGE is configured for training the generalized HNN to learn nonlinear dynamics present in the dynamical system from generic training data, utilizing the trained generalized HNN to forecast the nonlinear dynamics, wherein training the generalized HNN includes training the NN pre-processor to output the canonical coordinates given the noncanonical coordinates as input and training the HNN to output values produced by a Hamiltonian function of the canonical coordinates, utilizing the trained generalized HNN to forecast the nonlinear dynamics includes inputting values of the noncanonical coordinates to the trained NN pre-processor, generating, by the NN pre-processor, values of the canonical coordinates, and generating, by the HNN, values produced by the Hamiltonian function of the values of the canonical coordinates output from the NN pre-processor and quantifying, by the HNN, chaotic behavior from the forecasted nonlinear dynamics to discover and map one or more transitions between orderly states and chaotic states exhibited by the dynamical system.

12. The system of claim 11 wherein the generalized HNN is utilized to execute applications including a self-driving automobile application, a drone piloting application, a tracking application, an aerospace application, a social network dynamic application, and a control system application.

13. The system of claim 11 wherein the dynamical system is a nonlinear system.

14. The system of claim 11 wherein the generalized HNN is further configured to detect when a macroscopic system is unable to be modeled using Hamiltonian dynamics.

15. The system of claim 11 wherein the generalized HNN is trained using physics-informed machine learning.

16. The system of claim 11 wherein the generalized HNN is a feed-forward neural network that is configured to learn from the generic training data.

17. The system of claim 11 wherein the generalized HNN engine is further configured to utilize a customized loss function to compel a Hamiltonian phase space flow.

18. The system of claim 11 wherein the generalized HNN utilizes a neural network autoencoder to capture dimensionality.

19. The system of claim 11 wherein the dynamic system is a Hénon-Heiles system.

20. The system of claim 11 wherein the chaotic behavior is quantified using a smaller alignment indices metric.

21. A non-transitory computer readable medium having stored thereon executable instructions that when executed by a processor of a computer control the computer to perform steps comprising:
utilizing a neural network (NN) pre-processor to convert noncanonical coordinates associated with a dynamical system to canonical coordinates, wherein the noncanonical coordinates include position and velocity coordinates and the canonical coordinates have values that are nonlinear functions of values of the position and velocity coordinates and include position and conjugate momenta coordinates;
concatenating a Hamiltonian neural network (HNN) to the NN pre-processor to create a generalized HNN, wherein concatenating the HNN to the NN pre-processor includes connecting an output of the NN pre-processor to an input of the HNN and connecting an input of the NN pre-processor to receive the noncanonical coordinates such that when the NN pre-processor receives and converts the noncanonical coordinates, the NN pre-processor outputs the canonical coordinates to the HNN;
training the generalized HNN to learn nonlinear dynamics present in the dynamical system from generic training data, wherein training the generalized HNN includes training the NN pre-processor to output the canonical coordinates given the noncanonical coordinates as input and training the HNN to output values produced by a Hamiltonian function of the canonical coordinates;
utilizing the trained generalized HNN to forecast the nonlinear dynamics, wherein utilizing the trained generalized HNN to forecast the nonlinear dynamics includes inputting values of the noncanonical coordinates to the trained NN pre-processor, generating, by the NN pre-processor, values of the canonical coordinates, and generating, by the HNN, values produced by the Hamiltonian function of the values of the canonical coordinates output from the NN pre-processor; and quantifying chaotic behavior from the forecasted nonlinear dynamics to discover and map one or more transitions between orderly states and chaotic states exhibited by the dynamical system, wherein the dynamical system comprises a physical system and quantifying the chaotic behavior includes using the values output by the HNN to describe motion of the physical system.

22. The non-transitory computer readable medium of claim 21 wherein the generalized HNN is utilized to execute applications including a self-driving automobile application, a drone piloting application, a tracking application, an aerospace application, a social network dynamic application, and a control system application.

23. The non-transitory computer readable medium of claim 21 wherein the dynamical system is a nonlinear system.

24. The non-transitory computer readable medium of claim 21 wherein the generalized HNN is further configured to detect when a macroscopic system is unable to be modeled using Hamiltonian dynamics.

25. The non-transitory computer readable medium of claim 21 wherein the generalized HNN is trained using physics-informed machine learning.

26. The non-transitory computer readable medium of claim 21 wherein the generalized HNN is a feed-forward neural network that is configured to learn from the generic training data.

27. The non-transitory computer readable medium of claim 21 further comprising utilizing a customized loss function to compel a Hamiltonian phase space flow.

28. The non-transitory computer readable medium of claim 21 wherein the generalized HNN utilizes a neural network autoencoder to capture dimensionality.

29. The non-transitory computer readable medium of claim 21 wherein the dynamic system is a Hénon-Heiles system.

30. The non-transitory computer readable medium of claim 21 wherein the chaotic behavior is quantified using a smaller alignment indices metric.

* * * * *